United States Patent
Chen et al.

(10) Patent No.: US 9,288,505 B2
(45) Date of Patent: Mar. 15, 2016

(54) THREE-DIMENSIONAL VIDEO WITH ASYMMETRIC SPATIAL RESOLUTION

(75) Inventors: Ying Chen, San Diego, CA (US); Li Zhang, San Diego, CA (US); Rong Zhang, Dublin, OH (US); Yunfei Zheng, Cupertino, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 644 days.

(21) Appl. No.: 13/542,931

(22) Filed: Jul. 6, 2012

(65) Prior Publication Data

US 2013/0038686 A1 Feb. 14, 2013

Related U.S. Application Data

(60) Provisional application No. 61/522,559, filed on Aug. 11, 2011.

(51) Int. Cl.
*H04N 13/00* (2006.01)
*H04N 19/573* (2014.01)
*H04N 19/597* (2014.01)
(Continued)

(52) U.S. Cl.
CPC ........... *H04N 19/573* (2014.11); *H04N 19/105* (2014.11); *H04N 19/174* (2014.11); *H04N 19/176* (2014.11); *H04N 19/30* (2014.11); *H04N 19/46* (2014.11); *H04N 19/513* (2014.11);
(Continued)

(58) Field of Classification Search
CPC .................... H04N 13/0055; H04N 19/00769; H04N 13/0239; H04N 13/0059; H04N 13/0048
USPC ........................................ 348/43; 375/240.21
See application file for complete search history.

(56) References Cited

U.S. PATENT DOCUMENTS

| 5,107,705 A | * | 4/1992 | Wraight ................. E21B 19/20 348/85 |
| 5,329,369 A | | 7/1994 | Willis et al. |

(Continued)

FOREIGN PATENT DOCUMENTS

| EP | 1321893 A2 | 6/2003 |
| EP | 2810443 A1 | 12/2014 |

(Continued)

OTHER PUBLICATIONS

Video and Requirements: "Applications and Requirements on 3D Video Coding," ISO/IEC JTC1/SC29/WG11 MPEG2011/N12035, Mar. 2011, URL, ftp://ftp.merl.com/pub/avetro/3dv-cfp/docs/w12035.zip, 7 pp.

(Continued)

*Primary Examiner* — Sath V Perungavoor
*Assistant Examiner* — Howard D Brown, Jr.
(74) *Attorney, Agent, or Firm* — Shumaker & Sieffert, P.A.

(57) ABSTRACT

A video coding device may be configured to code a bitstream including multiple views plus depth information. Two of the views may have reduced resolutions, while a third view may have a full resolution. The third view may be predicted relative to upsampled versions of the two reduced-resolution views. Each view may include texture data and depth data, such that a view component may include a texture component and a depth component. Moreover, the texture and depth components may be arranged within an access unit according to a particular order, which may simplify component extraction from the access unit.

51 Claims, 12 Drawing Sheets

(51) Int. Cl.
*H04N 19/105* (2014.01)
*H04N 19/176* (2014.01)
*H04N 19/46* (2014.01)
*H04N 19/513* (2014.01)
*H04N 19/30* (2014.01)
*H04N 19/61* (2014.01)
*H04N 19/174* (2014.01)
*H04N 19/53* (2014.01)
*H04N 7/12* (2006.01)

(52) U.S. Cl.
CPC ............. *H04N19/53* (2014.11); *H04N 19/597* (2014.11); *H04N 19/61* (2014.11)

(56) References Cited

U.S. PATENT DOCUMENTS

| | | | |
|---|---|---|---|
| 5,821,986 A * | 10/1998 | Yuan et al. | 348/14.12 |
| 5,852,565 A | 12/1998 | Demos | |
| 6,104,434 A | 8/2000 | Nakagawa et al. | |
| 6,310,919 B1 * | 10/2001 | Florencio | 375/240.16 |
| 6,452,969 B1 * | 9/2002 | Yim | 375/240.02 |
| 6,665,344 B1 * | 12/2003 | Fimoff | 375/240.2 |
| 7,006,700 B2 | 2/2006 | Gilgen | |
| 7,163,335 B2 * | 1/2007 | Dishaw | E21B 19/165 374/121 |
| 8,160,149 B2 | 4/2012 | Demos | |
| 8,184,028 B2 | 5/2012 | Tsai | |
| 8,239,766 B2 | 8/2012 | Tian et al. | |
| 8,488,677 B2 | 7/2013 | Jeon et al. | |
| 8,750,632 B2 | 6/2014 | Nakamura et al. | |
| 2002/0120401 A1 * | 8/2002 | Macdonald et al. | E21B 44/005 702/6 |
| 2003/0202592 A1 | 10/2003 | Sohn et al. | |
| 2005/0041736 A1 | 2/2005 | Butler-Smith et al. | |
| 2005/0195899 A1 | 9/2005 | Han | |
| 2005/0195900 A1 * | 9/2005 | Han | 375/240.21 |
| 2006/0120614 A1 | 6/2006 | Flierl et al. | |
| 2006/0133492 A1 | 6/2006 | Boyce et al. | |
| 2006/0133503 A1 | 6/2006 | Park et al. | |
| 2006/0193524 A1 | 8/2006 | Tarumoto et al. | |
| 2006/0233258 A1 * | 10/2006 | Holcomb | 375/240.21 |
| 2006/0268005 A1 | 11/2006 | Hutchins et al. | |
| 2007/0177672 A1 * | 8/2007 | Yang | 375/240.25 |
| 2008/0152241 A1 | 6/2008 | Itoi et al. | |
| 2008/0179094 A1 * | 7/2008 | Repin | E21B 44/00 175/50 |
| 2008/0219350 A1 | 9/2008 | Guo et al. | |
| 2008/0232470 A1 | 9/2008 | Park et al. | |
| 2009/0002845 A1 | 1/2009 | Hosoya et al. | |
| 2009/0028245 A1 | 1/2009 | Vieron et al. | |
| 2009/0060034 A1 * | 3/2009 | Park et al. | 375/240.12 |
| 2009/0147848 A1 | 6/2009 | Park et al. | |
| 2009/0152005 A1 * | 6/2009 | Chapman | E21B 7/00 175/24 |
| 2009/0175334 A1 | 7/2009 | Ye et al. | |
| 2009/0187391 A1 * | 7/2009 | Wendt et al. | G01V 1/28 703/7 |
| 2009/0220000 A1 | 9/2009 | Park et al. | |
| 2009/0262804 A1 | 10/2009 | Pandit et al. | |
| 2009/0262840 A1 | 10/2009 | Jan et al. | |
| 2010/0020871 A1 * | 1/2010 | Hannuksela et al. | 375/240.12 |
| 2010/0027619 A1 | 2/2010 | Doser et al. | |
| 2010/0046906 A1 | 2/2010 | Kanamori et al. | |
| 2010/0098157 A1 | 4/2010 | Yang | |
| 2010/0111183 A1 | 5/2010 | Jeon et al. | |
| 2010/0118933 A1 | 5/2010 | Pandit et al. | |
| 2010/0147510 A1 * | 6/2010 | Kwok | G01V 11/00 166/250.01 |
| 2010/0155142 A1 * | 6/2010 | Thambynayagam | E21B 44/00 175/61 |
| 2010/0158129 A1 | 6/2010 | Lai et al. | |
| 2010/0165077 A1 | 7/2010 | Yin et al. | |
| 2010/0166070 A1 * | 7/2010 | Goel | 375/240.15 |
| 2010/0177819 A1 | 7/2010 | Jeon et al. | |
| 2010/0246683 A1 | 9/2010 | Webb et al. | |
| 2010/0250139 A1 * | 9/2010 | Hobbs | E21B 47/12 702/6 |
| 2010/0254458 A1 | 10/2010 | Amon et al. | |
| 2010/0260268 A1 | 10/2010 | Cowan et al. | |
| 2010/0284466 A1 | 11/2010 | Pandit et al. | |
| 2011/0026608 A1 | 2/2011 | Luthra | |
| 2011/0038422 A1 | 2/2011 | Cheon et al. | |
| 2011/0058017 A1 | 3/2011 | Lee et al. | |
| 2011/0090959 A1 | 4/2011 | Wiegand et al. | |
| 2011/0115880 A1 | 5/2011 | Yoo et al. | |
| 2011/0170012 A1 | 7/2011 | Cheon et al. | |
| 2011/0216833 A1 | 9/2011 | Chen et al. | |
| 2011/0221861 A1 | 9/2011 | Jeon et al. | |
| 2011/0222602 A1 | 9/2011 | Sung et al. | |
| 2011/0261883 A1 | 10/2011 | Bang et al. | |
| 2011/0310982 A1 | 12/2011 | Yang et al. | |
| 2012/0056981 A1 | 3/2012 | Tian et al. | |
| 2012/0075436 A1 * | 3/2012 | Chen et al. | 348/51 |
| 2012/0084652 A1 | 4/2012 | Martinez et al. | |
| 2012/0229602 A1 * | 9/2012 | Chen et al. | 348/43 |
| 2012/0274664 A1 * | 11/2012 | Fagnou | G06F 3/04855 345/660 |
| 2013/0022113 A1 | 1/2013 | Chen et al. | |
| 2013/0022127 A1 | 1/2013 | Park et al. | |
| 2013/0057646 A1 | 3/2013 | Chen et al. | |
| 2013/0127987 A1 | 5/2013 | Zhang et al. | |
| 2013/0128965 A1 | 5/2013 | Zhang et al. | |
| 2013/0182760 A1 | 7/2013 | Sasai et al. | |
| 2013/0188013 A1 | 7/2013 | Chen et al. | |
| 2013/0265409 A1 * | 10/2013 | Tjhang | H04N 5/23229 348/82 |
| 2013/0287093 A1 * | 10/2013 | HANNUKSELA et al. | 375/240.02 |
| 2013/0311147 A1 * | 11/2013 | Greenwood | G06Q 10/06 703/1 |
| 2013/0315571 A1 * | 11/2013 | Park et al. | 386/329 |
| 2014/0085416 A1 | 3/2014 | Chang et al. | |
| 2014/0218473 A1 * | 8/2014 | Hannuksela et al. | 348/43 |
| 2014/0341292 A1 * | 11/2014 | Schwarz et al. | 375/240.16 |

FOREIGN PATENT DOCUMENTS

| | | |
|---|---|---|
| JP | 2010507275 A | 3/2010 |
| JP | 2010507961 A | 3/2010 |
| JP | 2010524338 A | 7/2010 |
| JP | 2010525724 A | 7/2010 |
| JP | 2011509631 A | 3/2011 |
| JP | 2013030898 A | 2/2013 |
| JP | 2014517563 A | 7/2014 |
| KR | 100919885 B1 | 9/2009 |
| KR | 20100014553 A | 2/2010 |
| KR | 20100105877 A | 9/2010 |
| KR | 20110093792 A | 8/2011 |
| TW | I332794 B | 11/2010 |
| TW | I332799 B | 11/2010 |
| TW | I333201 B | 11/2010 |
| TW | I335183 B | 12/2010 |
| WO | 2008048499 A2 | 4/2008 |
| WO | 2008051041 A1 | 5/2008 |
| WO | 2008123917 A2 | 10/2008 |
| WO | 2008133455 A1 | 11/2008 |
| WO | 2009091383 A2 | 7/2009 |
| WO | 2009091383 A3 | 7/2009 |
| WO | 2010043773 A1 | 4/2010 |
| WO | 2010073513 A1 | 7/2010 |
| WO | 2010096189 A1 | 8/2010 |
| WO | WO2010088420 A1 | 8/2010 |
| WO | WO2010123862 A1 | 10/2010 |
| WO | 2010126613 A2 | 11/2010 |
| WO | WO2010126227 A2 | 11/2010 |
| WO | 2011046607 A2 | 4/2011 |
| WO | 2011094034 A2 | 8/2011 |
| WO | WO2011100735 A1 | 8/2011 |
| WO | 2011128269 A1 | 10/2011 |
| WO | 2012006299 A1 | 1/2012 |
| WO | 2012039936 | 3/2012 |

(56) References Cited

FOREIGN PATENT DOCUMENTS

| WO | 2012039939 A2 | 3/2012 |
|---|---|---|
| WO | 2012122364 | 9/2012 |
| WO | 2013113997 A1 | 8/2013 |

OTHER PUBLICATIONS

Wildeboer, et al., "Depth up—sampling for depth coding using view information," Proceedings of 3DTV Conference, May 2011, 4 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "WD4: Working Draft 4 of High-Efficiency Video Coding," 6th Meeting: Torino, IT, Jul. 14-22, 2011, JCTVC-F803_d2, 226 pp.
Bross et al., "WD5: Working Draft 5 of High-Efficiency Video Coding," 7th Meeting: Geneva, CH, Nov. 21-30, 2011, JCTVC-G1103_d2, 215 pp.
Chen et al., "Description of 3D Video Coding Technology Proposal by Qualcomm Incorporated," MPEG of ISO/IEC/JTC1/SC29/WG11, Geneva, Switzerland, Document M22583, Nov. 2011, 21 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
International Preliminary Report on Patentability—PCT/US2012/045963, The International Bureau of WIPO—Geneva, Switzerland, Oct. 22, 2013, 11 pp.
International Search Report and Written Opinion—PCT/US2012/045963—ISA/EPO—Oct. 15, 2012, 15 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Second Written Opinion of International Application No. PCT/US2012/045963, mailed Jul. 25, 2013, 7 pp.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
Bross et al., "WD5: Working Draft 5 of High-Efficiency Video Coding," JCTVC-G1103, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.
Chen, et al., "Low-Complexity Asymmetric Multiview Video Coding," 2008 IEEE International Conference on Multimedia and Expo, ICME 2008, pp. 773-776.
Chen, et al., "Picture-Level Adaptive Filter for Asymmetric Stereoscopic Video," 15th IEEE International Conference on Image Processing, ICIP 2008, pp. 1944-1947.

Chen, et al., "Regionally Adaptive Filtering for Asymmetric Stereoscopic Video Coding," IEEE International Symposium on Circuits and Systems, 2009, ISCAS 2009. pp. 2585-2588.
Gary J, et al., "Editors' draft revision to ITU-T Rec. H.264 | ISO/IEC 14496-10 Advanced Video Coding—in preparation for ITU-T SG 16 AAP Consent (in integrated form)", Joint Video Team (JVT) of ISO/IEC MPEG & ITU-T VCEG (ISO/IEC JTC1/SC29/WG11 and ITU-T SG16 Q.6) 30th Meeting: Geneva, CH, Jan. 29-Feb. 3, 2009, pp. 1-683.
He Wenge et al., "Asymmetric Stereoscopic Video Encoding Algorithm Based on Joint Compensation Prediction", IEEE International Conference on Communications and Mobile Computing, Jan. 6, 2009, pp. 191-194, XP031434775, ISBN: 978-0-7695-3501-2.
"Joint Draft 8.0 on Multiview Video Coding", 28th JVT meeting, Hannover, Germany, Document: JVT-AB204 (rev.1), Jul. 2008. available from http:// wftp3. itu.int/av-arch/jvt-site/2008_07_Hannover/JVT-AB204.
JVT-AD007, "Editor's draft revision to ITU-T Rec. H.264, ISO/IEC 14496-10 Advanced Video Coding—in preparation for ITU-T SG 16 AAP Consent (in integrated form)," 30th JVT meeting, Geneva, CH, Feb. 2009, available http://wftp3.itu.int/av-arch/jvt-site/2009_01_Geneva/JVT-AD007.zip.
Schwarz et al., "Overview of the Scalable Video Coding Extension of the H.264/AVC Standard", IEEE Transactions on Circuits and Systems for Video Technology, Sep. 1, 2007, pp. 1103-1120, vol. 17, No. 9, IEEE Service Center, XP011193019, ISSN: 1051-8215, DOI: 10.1109/TCSVT.2007.905532.
Vetro, et al., "Joint Multiview Video Model (JMVM) 2.0," Joint Video Team (JVT) of ISO/IEC MPEG & ITU-T VCEG (ISO/IEC JTC1/SC29/WG11 and ITU-T SG16 Q.6), 21st Meeting: Hangzhou, China, Oct. 20-27, 2006, JVT-U207, 11 pages.
Zhang, Jun, et al., "Joint Multiview Video Plus Depth Coding", IEEE 17th International Conference on Image Processing, Hong Kong, Sep. 26-29, 2010, pp. 2865-2868.
"Advanced video coding for generic audiovisual services; H.264 (Mar. 2009)", ITU-T Standard, International Telecommunication Union, Geneva; CH, No. H.264 (Mar. 2009), Mar. 16, 2009, pp. 1-670, XP017436035, [retrieved on Oct. 26, 2009].
"Applications and Requirements on 3D Video Coding," ISO/IEC JTC1/SC29/WG11, MPEG2011/N12035, Geneva, Switzerland, Mar. 2011, XP030018528, 7 pp.
Hannuksela, "Test Model under Consideration for AVC-based 3D video coding," 98. MPEG Meeting; Nov. 28, 2011-Feb. 12, 2012; Geneva, CH; (Motion Picture Expert Group or ISO/IEC JTC1/SC29/WG11), No. N12349, Dec. 2011, XP030018844, 15 pp.
Bross B., et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pp. [uploaded in parts].
Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pp. [uploaded in parts].
"Call for Proposals on 3D Video Coding Technology," ISO/IEC JTC1/SC29/WG11, MPEG2011/N12036, Geneva, Switzerland, Mar. 2011, 20 pp.
"Changes to VSRS Software manual," found at ftp://ftp.merl.com/pub/avetro/3dv-cfp/software/, dated Feb. 19, 2008-Aug. 27, 2009, 3 pp.
Tsai et al., CE4 Subset3: Slice Common Information Sharing, 20110307, No. JCTVC-E045, Mar. 16-23, 2011, XP030008551, ISSN: 0000-0007, 7 pp.
De Silva et al., "Display Dependent Preprocessing of Depth Maps Based on Just Noticeable Depth Difference Modeling," IEEE Journal of Selected Topics in Signal Processing, vol. 5, No. 2, Apr. 2011, pp. 335-351.
Grewatsch et al., "Sharing of Motion Vectors in 3D Video Coding," Oct. 2004 International conference on Image Processing (ICIP), University of Rostock Institute of Communications Engineering, Rostock, Germany, pp. 3271-3274.

(56) References Cited

OTHER PUBLICATIONS

Hannuksela et al., "3D-AVC Draft Text 3," Document JCT3V-A1002, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 68 pp.

Hannuksela M.M., "3DV-ATM Slice Header Prediction," MPEG Meeting; Feb. 2012; San Jose, CA; (Motion Picture Expert Group or ISO/IEC JTC1/SC29/WG11), No. M23697, XP030052222, 11 pp.

ISO/IEC JTC 1/SC 29, ISO/IEC 14496-5:2001/FDAM 15:2009(E), ISO/IEC JTC 1/SC 29/WG 11, Information technology—Coding of audio-visual objects—Part 5: Reference software, Amendment 15: Reference software for Multiview Video Coding, Dec. 2009, 5 pp.

ITU-T H.264, Series H: Audiovisual and Multimedia Systems, Infrastructure of audiovisual services—Coding of moving video, Advanced video coding for generic audiovisual services, Mar. 2010, 674 pp.

Lee et al., "Description of AVC compatible 3D video coding technology by Samsung," MPEG Meeting; Nov. 28, 2011-Dec. 2, 2011; Geneva, CH; (Motion Picture Expert Group or ISO/IEC JTC1/SC29/WG11), No. M22632, Nov. 2011, XP030051195, 24 pp.

Merkle et al., "Multi-View Video Plus Depth Representation and Coding," IEEE International Conference on Image Processing, 2007, ICIP 2007, Sep. 16, 2007-Oct. 19, 2007, vol. 1, 4 pp.

Misra et al., "Entropy Slices for Parallel Entropy Coding," Joint Collaborative Team on Video Coding (JCT-VC) of ITU-T SG16 WP3 and ISO/IEC JTC1/SC29/WG11, 3rd meeting: Guangzhou, CN, Oct. 2010, JCTVC-C256, 6 pp.

Oh et al., H.264-Based Depth Map Sequence Coding Using Motion Information of Corresponding Texture Video, Gwangju Institute of Science and Texhnology (GIST), Korea, Jan. 2006, pp. 898-907.

Ouedraogo, et al., "Results on Slice Header Modifications", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F503, 9 pp.

"Report on Experimental Framework for 3D Video Coding," ISO/IEC JTC1/SC29/WG11, MPEG2010/N11631, Guangzhou, China, Oct. 2010, 10 pp.

Riabtsev, "MPEG-4 AVC/H.264 Motion Vector Prediction Rev. 4," available at http://www.academia.edu/6574861/MPEG-4_AVC_H.264_Motion_Vector_Prediction, 8 pp.

Suzuki et al., "WD on MVC extensions for inclusion of depth maps," ISO/IEC/JTC1/SC29/WG11/N12351, Dec. 2011, No. M23805 WD, XP002684667, 24 pp.

Tian et al., "On 2D + Depth SEI Message," MPEG Meeting; Apr. 2009; Maui; (Motion Picture Expert Group or ISO/I EC JTC1/SC29/WG11), No. M16320, XP030044917, 10 pp.

Tian et al., "On Spatially Interleaved Pictures SEI," JVT Meeting; Jan. 29-Feb. 3, 2009; Geneva. CH; (Joint Video Team of ISO/IEC JTC1/SC29/ WG11 and ITU-T SG. 16), No. JVT-AD017_ri, XP030007452, ISSN: 0000-0079, 12 pp.

"VSRS Software Manual," SoftwareManualVSRS, version VSRS 3.0, found at ftp://ftp.merl.com/pub/avetro/3dv-cfp/software/, May 28, 2009, 19 pp.

Hannuksela et al., "3D-AVC Draft Text 8," Joint Collaborative Team on 3D Video Coding Extension Developmentof ITU-T SG 16 WP 3 and ISO/IEC JTC 1/SC 29/WG 11, Document: JCT3VF1002_v3, Oct. 25-Nov. 1, 2013, 62 pp.

ITU-T H.265, Series H: Audiovisual and Multimedia Systems, Infrastructure of audiovisual services—Coding of moving video, High efficiency video coding, The International Telecommunication Union, Apr. 2015, 634 pp.

Jiang et al., "DIBR-Based 3D Videos Using Non Video Rate Range Image Stream," International Conference on Multimedia and Expo, IEEE, Jul. 9-12, 2006, pp. 1873-1876.

Kamolrat et al., "3D Motion Estimation for Depth Image Coding in 3D Video Coding," IEEE Transactions on Consumer Electronics, IEEE, May 2009, vol. 55, No. 2, pp. 824-830.

Kauff et al., "Depth map creation and image-based rendering for advanced 3DTV services providing interoperability and scalability," Signal Processing. Image Communication, Elsevier Science Publishers, Amsterdam, NL, vol. 22, No. 2, XP005938670, pp. 217-234.

Seo et al., "Motion information sharing mode for depth video coding," 3DTV-conference: The True Vision-Capture, Transmission and Display of 3D Video (3DTV-CON), 2010, Jun. 7, 2010, pp. 1-4, IEEE, XP031706528, ISBN: 978-1-4244-6377-0, DOI: 10.1109/3DTV.2010.5506505.

\* cited by examiner ns may have a reduced
THREE-DIMENSIONAL VIDEO WITH ASYMMETRIC SPATIAL RESOLUTION This application claims the benefit of U.S. Provisional Application No. 61/522,559, filed Aug. 11, 2011, the entire contents of which are hereby incorporated by reference.

TECHNICAL FIELD

This disclosure relates to video coding, and more particularly, to coding video data for three-dimensional video playback.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video coding techniques, such as those described in the standards defined by ITU-T H.261, ISO/IEC MPEG-1 Visual, MPEG-2, MPEG-4, ITU-T H.263 or ITU-T H.264/MPEG-4, Part 10, Advanced Video Coding (AVC) (also referred to simply as H.264/AVC or H.264), the upcoming High Efficiency Video Coding (HEVC) standard, and extensions of such standards, to transmit and receive digital video information more efficiently.

Efforts have been made to develop new video coding standards based on H.264/AVC. One such standard is the scalable video coding (SVC) standard, which is the scalable extension to H.264/AVC. Another standard is multi-view video coding (MVC), which is the multiview extension to H.264/AVC. A joint draft of MVC is described in JVT-AD007, "Editors' draft revision to ITU-T Rec. H.264|ISO/IEC 14496-10 Advanced Video Coding," 30th JVT meeting, Geneva, Switzerland, January-February 2008, available at http://wftp3.itu.int/av-arch/jvt-site/2009_01_Geneva/JVT-AD007.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for coding multiview video data, e.g., for three-dimensional video playback. In accordance with these techniques, view components of video data may include both texture and depth components. Some of the view components may have a reduced resolution (e.g., half-resolution) relative to originally received data. Other view components may have full resolution, and be coded relative to upsampled versions of the reduced resolution view components. For example, a left view and a right view may have reduced resolutions, and a center view may have a full resolution. A view component of the center view may be predicted from upsampled versions of view components of the left view and the right view. In this manner, video data according to the techniques of this disclosure may include asymmetric spatial resolution for supporting three-dimensional video playback.

In one example, a method includes decoding video data of a first coded view to produce a first picture having a first resolution, decoding video data of a second coded view to produce a second picture having the first resolution, upsampling the first picture to form a first upsampled picture having a second resolution, wherein the second resolution is greater than the first resolution, upsampling the second picture to form a second upsampled picture having the second resolution, and decoding video data of a third coded view relative to the first upsampled picture and the second upsampled picture to produce a third picture having the second resolution.

The method may further include downsampling a first received picture to produce a first downsampled picture, wherein the first received picture has the second resolution, downsampling a second received picture to produce a second downsampled picture, wherein the second received picture has the second resolution, encoding the first downsampled picture to produce the video data of the first coded view, encoding the second downsampled picture to produce the video data of the second coded view, and encoding a third received picture relative to the first upsampled picture and the second upsampled picture to produce the video data of the third coded view, wherein the third received picture has the second resolution.

In another example, a device for coding video data includes a video coder configured to decode video data of a first coded view to produce a first picture having a first resolution, decode video data of a second coded view to produce a second picture having the first resolution, upsample the first picture to form a first upsampled picture having a second resolution, wherein the second resolution is greater than the first resolution, upsample the second picture to form a second upsampled picture having the second resolution, and decode video data of a third coded view relative to the first upsampled picture and the second upsampled picture to produce a third picture having the second resolution. The video coder may comprise a video decoder or a video encoder.

In some examples, the video coder comprises a video encoder, the first picture comprises a first downsampled picture, the second picture comprises a second downsampled picture, and the video encoder is further configured to downsample a first received picture to produce the first downsampled picture, wherein the first received picture has the second resolution, downsample a second received picture to produce the second downsampled picture, wherein the second received picture has the second resolution, encode the first downsampled picture to produce the video data of the first coded view, encode the second downsampled picture to produce the video data of the second coded view, and encode a third received picture relative to the first upsampled picture and the second upsampled picture to produce the video data of the third coded view, wherein the third received picture has the second resolution.

In another example, a device for coding video data includes means for decoding video data of a first coded view to produce a first picture having a first resolution, means for decoding video data of a second coded view to produce a second picture having the first resolution, means for upsampling the first picture to form a first upsampled picture having a second resolution, wherein the second resolution is greater than the first resolution, means for upsampling the second picture to form a second upsampled picture having the second resolution, and means for decoding video data of a third coded view relative to the first upsampled picture and the second upsampled picture to produce a third picture having the second resolution.

The device may further include means for downsampling a first received picture to produce the first downsampled picture, wherein the first received picture has the second resolution, means for downsampling a second received picture to produce the second downsampled picture, wherein the second received picture has the second resolution, means for encoding the first downsampled picture to produce the video data of the first coded view, means for encoding the second downsampled picture to produce the video data of the second coded view, and means for encoding a third received picture relative to the first upsampled picture and the second upsampled picture to produce the video data of the third coded view, wherein the third received picture has the second resolution.

In another example, a computer-readable storage medium has stored thereon instructions that, when executed, cause one or more processors to decode video data of a first coded view to produce a first picture having a first resolution, decode video data of a second coded view to produce a second picture having the first resolution, upsample the first picture to form a first upsampled picture having a second resolution, wherein the second resolution is greater than the first resolution, upsample the second picture to form a second upsampled picture having the second resolution, and decode video data of a third coded view relative to the first upsampled picture and the second upsampled picture to produce a third picture having the second resolution.

The computer-readable storage medium may further have stored thereon instructions that cause the one or more processors to downsample a first received picture to produce the first downsampled picture, wherein the first received picture has the second resolution, downsample a second received picture to produce the second downsampled picture, wherein the second received picture has the second resolution, encode the first downsampled picture to produce the video data of the first coded view, encode the second downsampled picture to produce the video data of the second coded view, and encode a third received picture relative to the first upsampled picture and the second upsampled picture to produce the video data of the third coded view, wherein the third received picture has the second resolution.

In another example, a 3D video codec, implemented in or by a device, codes multiple sequence parameter sets, with at least one of the parameter sets belonging to a sequence parameter set (e.g., a sequence parameter set compliant to an H.264/AVC profile) and another of the parameter sets belonging to a subset sequence parameter set (which may be compliant to an H.264/MVC profile), and still another of the parameter sets belonging to a new subset sequence parameter set (subset SPS) compliant to a 3DV profile. When different views have asymmetric resolutions, the 3D video codec may code two more sequence new parameter sets. This disclosure provides a new subset sequence parameter set corresponding to a depth view component, which may contain a flag disabling inter-view prediction for the depth view component. When the new subset SPS is added, the subset SPS may share the same NAL unit type as the original subset SPS, while extending the existing SPS. Inside the extended syntax a new flag, referred to herein as "additional_extension2_data_flag," is introduced to enable further extensibility of the new subset SPS.

The details of one or more examples are set forth in the accompanying drawings and the description below. Other features, objects, and advantages will be apparent from the description and drawings, and from the claims.

DETAILED DESCRIPTION

Figure 1:
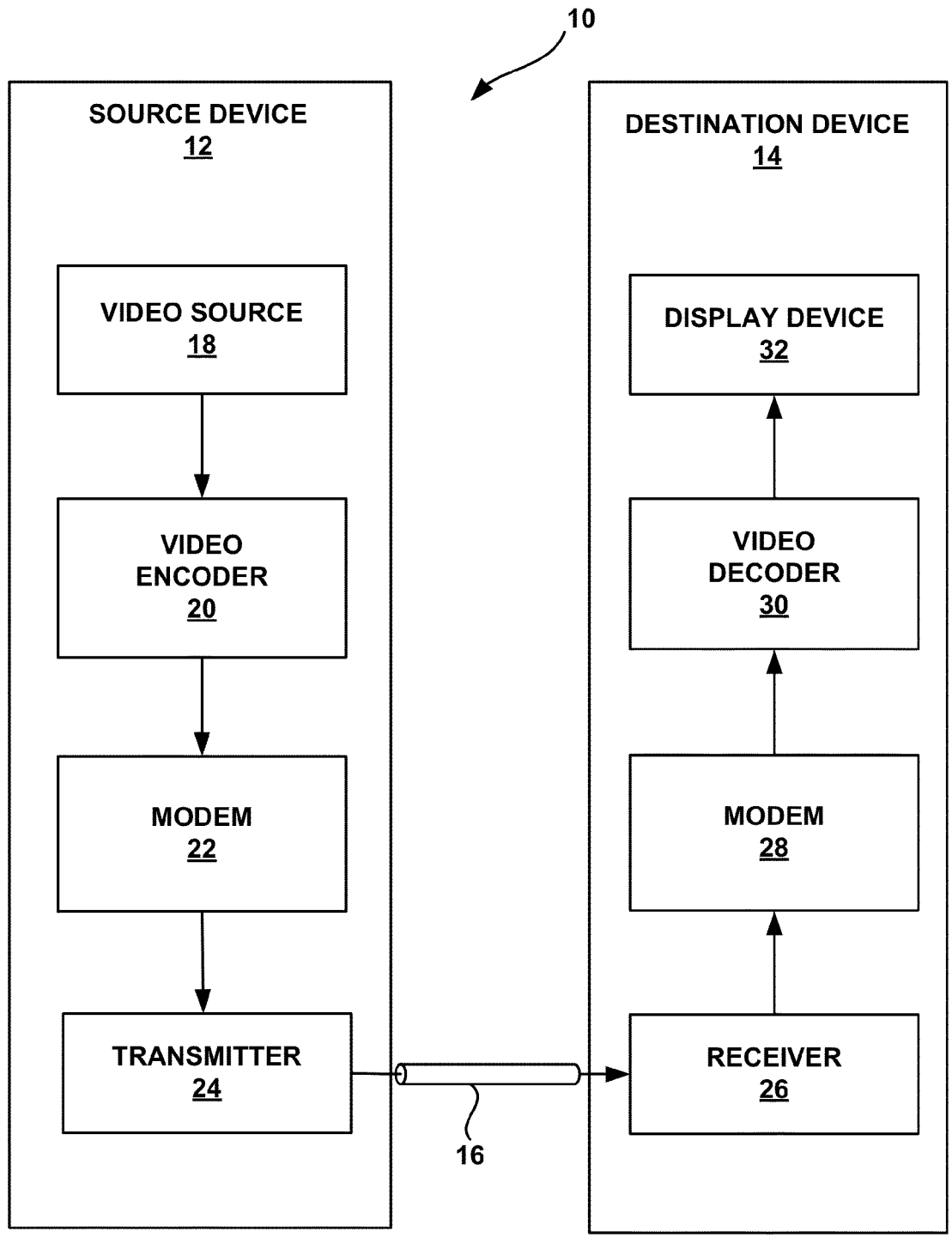
FIG. 1 is a block diagram illustrating an example video encoding and decoding system that may utilize techniques for coding multiview video data having asymmetric spatial resolution among the views.

In general, this disclosure describes techniques for coding (e.g., encoding and/or decoding) video data having asymmetric spatial resolutions. A video encoder, for example, may encode received pictures of a set of views by downsampling the spatial resolution of the pictures, then encoding the downsampled pictures. The video encoder may also encode pictures of one or more other views by decoding and upsampling the encoded pictures that were downsampled and use these decoded pictures as reference for the pictures of the other one or more views. Likewise, a video decoder may be configured to decode and upsample pictures of a set of views having a reduced resolution and use these decoded pictures to decode pictures of one or more views having a full resolution.

The pictures may include texture and/or depth information. That is, in accordance with the techniques of this disclosure, a video coding device (e.g., a video encoder or a video decoder) may be configured to code texture and depth information in the manner described herein. View components of some views of a coded bitstream may have a full resolution, while view components of other views of the coded bitstream may have a reduced resolution, e.g., half resolution, where the view components may include both texture components and depth components. In this manner, both texture and depth information may have either a full resolution or a reduced resolution for various views, in accordance with the techniques of this disclosure. A view component of a particular view may include a texture component and a depth component, and the texture and depth components of the view component may have the same resolution.

For example, two views may include view components coded with half-resolution, in either the horizontal or vertical direction. When originally captured or generated, pictures of the two views may have a first resolution. A video encoder may downsample or subsample the pictures of these two views to reduce the resolution, e.g., by half. Likewise, the video encoder may generate depth information having the reduced resolution for these views. Texture components for these view components may conform to MVC stereo high profile. A third view may be coded with a full resolution, and inter-view prediction may be enabled by using upsampled low-resolution view components as reference. For example, the video encoder may upsample the pictures (texture and/or depth) of the two views, then encode pictures of the third view relative to the upsampled pictures of the other two views. Likewise, a video decoder may upsample decoded pictures of the two views, then decode pictures of the third view relative to the upsampled, decoded pictures.

This disclosure also describes new profiles to indicate whether the bitstream includes one or more views that are coded according to the techniques of this disclosure. H.264/AVC does not specify the encoder, but the encoder is tasked with guaranteeing that the generated bitstreams are standard-compliant for a decoder. In the context of video coding standards, a "profile" corresponds to a subset of algorithms, features, or tools, and constraints that apply to the subset of algorithms, features, or tools. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264/AVC standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of H.264/AVC (Advanced Video Coding), coded video segments are organized into network abstraction layer (NAL) units, which may provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and supplemental enhancement information (SEI) NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as Supplemental Enhancement Information (SEI) NAL units.

SEI NAL units may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

The example of MVC provides sequence parameter set (SPS) extensions for multiview video. The SPS extension information may be contained in sub-SPS NAL units, which may have a different NAL unit type than the other NAL units. Profile and level information for the supported operation points may be included in NAL units including SPS extension information.

In accordance with the techniques of this disclosure, an SPS may indicate (e.g., signal) the spatial resolution (e.g., in units of macroblocks (MBs) or largest coding units (LCUs)) of a view. LCUs of the upcoming High Efficiency Video Coding standard are conceptually similar to macroblocks of H.264/AVC, and may also be referred to as "treeblocks." A video decoder may use the information in the SPS to determine whether the view has an enhanced vertical or horizontal scale increase. The SPS may also indicate whether a view is predicted relative to a lower resolution view, such that a video decoder may determine whether the lower resolution view is to be upsampled to the resolution of the current view being decoded in order to decode the current view. The SPS may further indicate whether a view is predicted relative to another view of the same resolution. In this manner, the SPS may indicate prediction from low-resolution views to high-resolution views, as well as prediction among high-resolution views, if any.

Furthermore, video coding devices may be configured to reuse motion prediction for texture components to code corresponding depth components. For example, if a texture component and a depth component are of the same resolution, there may be the same number of blocks in the texture and depth components, and each of the blocks in a texture component may be collocated with a corresponding block in a corresponding depth component. To avoid duplicative motion searches, and to reduce the amount of data in the bitstream, video coding devices may apply the same motion information for a block of a texture component to a collocated block of a corresponding depth component when coding the depth component. In this manner, a block of the depth view component may take the motion vector of the collocated block of the texture view component, and no further motion information need be signaled if the coding mode for the depth view component is inter-component motion prediction.

FIG. 1 is a block diagram illustrating an example video encoding and decoding system 10 that may utilize techniques for coding multiview video data having asymmetric spatial resolution among the views. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which concern coding multiview video data having asymmetric spatial resolution among the views, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for coding multiview video data having asymmetric spatial resolution among the views. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding multiview video data having asymmetric spatial resolution among the views may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to code multiview video data having asymmetric spatial resolution among the views. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured to retrieve encoded data from a storage medium.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coding unit" may refer to any independently decodable unit of a video frame such as an entire frame, a slice of a frame, a group of pictures (GOP) also referred to as a sequence, or another independently decodable unit defined according to applicable coding techniques.

In accordance with the techniques of this disclosure, video encoder 20 may be configured to encode multiview video data having asymmetric spatial resolution among the views. That is, video encoder 20 may receive raw (uncoded) pictures from video source 18 for various views, each of the pictures having a particular resolution. Video encoder 20 may reduce the resolution of pictures of some of the views, e.g., by half, and encode pictures of other views relative to upsampled versions of the reduced resolution pictures.

Each of the views may include texture and/or depth information, in accordance with the techniques of this disclosure. As noted above, a bitstream may be organized into a set of views, where each view corresponds to a sub-bitstream of the bitstream. Moreover, the bitstream may be partitioned into units of video data according to temporal locations, where the temporal locations correspond to output (that is, display) time for the units of video data. For example, a bitstream may be partitioned into access units, where each access unit includes all data for a particular temporal instance. Thus, an access unit corresponding to output time t may include data for each of the views having an output time of t.

More particularly, an access unit may include a set of one or more view components, where each of the view components corresponds to a particular one of the views. In accordance with the techniques of this disclosure, each view component may include a texture view component and a depth view component. The texture and depth view components may likewise each include one or more NAL units, which may encapsulate slices of texture or depth information. For example, a texture view component may include one or more NAL units encapsulating respective texture slices, while a depth view component may include one or more NAL units encapsulating respective depth slices. The texture slices may include luminance and/or chrominance data for the picture corresponding to the texture view component, while the depth slices may include depth information for the depth map corresponding to the depth view component.

In accordance with the techniques of this disclosure, video encoder 20 may reuse certain prediction information, determined when coding the texture view component, to code the depth view component. For example, the texture view component and the depth view component may have the same spatial resolution. That is, for each pixel in the texture view component, there may be a corresponding, collocated pixel in the depth view component. Thus, block boundaries for blocks in the texture view component may also be collocated with block boundaries for blocks in the depth view component. Block-based coding may include inter-prediction, which may involve the calculation of one or more motion vectors for a block. Rather than recalculating motion vectors for, e.g., the depth view component, video encoder 20 may calculate a motion vector for a block in the texture view component, then reuse the calculated motion vector to code a collocated block in the depth view component. Thus, a separate motion vector for the depth view component need not be signaled.

Furthermore, video encoder 20 may code view components of certain views using inter-view prediction. In two-dimensional video coding, video data may be predicted using intra-prediction (that is, spatial prediction, or prediction based on data within the same picture) or inter-prediction (that is, temporal prediction, or prediction based on data of a previously coded picture). In three-dimensional video coding, video data may additionally be predicted using inter-view prediction. In general, view components corresponding to the same temporal location (that is, having the same or substantially the same playback time) may be horizontally offset from one another to produce a three-dimensional effect when displayed substantially simultaneously to a viewer. Therefore, there may be a significant amount of redundant data in the two view components that can be exploited through the use of inter-view prediction.

For example, a block in one view component may be substantially similar to a block of the other view component, but shifted horizontally. This horizontal shift may be referred to as disparity between the two blocks. Accordingly, video encoder 20 may code one of the blocks in one view relative to the other block in the other view using a disparity vector. The disparity vector may be substantially similar to a motion vector, except that the disparity vector points to a block in a different view, rather than a picture in a different temporal location.

In accordance with the techniques of this disclosure, view components for two views may be downsampled to a reduced resolution, e.g., one-half resolution. A third view may be coded relative to the downsampled views. Video encoder 20 may downsample view components of the reduced resolution views, then code the downsampled view components. To code the full resolution view, video encoder 20 may decode and then upsample the downsampled view components, to reproduce full resolution versions of the downsampled view components, then perform inter-view prediction of the third (full-resolution) view component relative to either or both of the upsampled view components.

As one example, the two downsampled views may be referred to, respectively, as a "left view" and a "right view." The full resolution view may be referred to as a "center view." In this example, the left view may correspond to a camera perspective that is horizontally to the left of the center view, and the center view may correspond to a camera perspective that is horizontally to the left of the right view. In this manner, the center view may correspond to a camera perspective that is between the left view and the right view.

Continuing the example above, video encoder 20, or a pre-processing unit, may receive, as an example, images from six different cameras. The cameras may be physical cameras in a camera array or virtual cameras, e.g., camera perspectives used by a computing device when rendering computer graphics. Video encoder 20 (or the pre-processing unit) may use the pictures to generate depth maps corresponding to three of the pictures, then code three views, rather than six views. The depth maps may be coded as luminance data without corresponding chrominance data. Thus, rather than coding image data for the six pictures, video encoder 20 may code image data for three of the pictures and depth maps for the three pictures. Video decoder 30 (or a rendering device associated with video decoder 30) may be configured to use the depth maps to reproduce the pictures that were not coded, or pictures at other horizontal camera perspectives.

Video encoder 20 may arrange the data of the pictures and depth maps into view components. Specifically, for each of the remaining three views (left view, right view, and center view), video encoder 20 may provide both texture information and depth information, in the form of texture components and depth components. Moreover, video encoder 20 may downsample the texture and depth components of the left and right views, then code the downsampled versions of the texture and depth components of the left and right views. Then, video encoder 20 may decode and upsample the texture and depth components of the left and right views, and code a full resolution version of the texture and depth data of the center view relative to the upsampled texture and depth components of the left and right views.

Video encoder 20 may code the texture components using inter- or intra-prediction. When coding the texture components using inter-prediction, video encoder 20 may calculate one or more motion vectors for each block. That is, video encoder 20 may perform a motion search to identify a reference block that closely matches the current block being coded. For example, when coding a current block of a texture component, video encoder 20 may perform a motion search in one or more previously coded pictures of the same view to identify a closely matching reference block. Video encoder 20 may then calculate a motion vector that identifies the reference block relative to the current block. The depth and texture components of the same view component may have the same spatial resolution. Thus, rather than separately performing a motion search when coding a block of the corresponding depth component, video encoder 20 may reuse the motion vector for the block in the texture component. Thus, video encoder 20 may code the current block of the depth component using a reference block in the depth component that is collocated with the reference block in the corresponding texture component.

Video encoder 20 may further provide signaling data indicative of a profile to which the bitstream corresponds. In accordance with the techniques of this disclosure, the profile may comprise an asymmetric multiview plus depth video profile. In this profile, a bitstream may include multiple views, each view having view components including both texture and depth components, and the view components need not be the same between views. For example, assuming that the original pictures, prior to coding, have a first resolution, some of the views may have a reduced resolution relative to the first resolution when coded, while other views may have the first resolution.

For example, the original resolution may comprise 1024× 768 pixels, and the reduced resolution may comprise 512×

768 pixels. In one example, view components of the left and right views may have 512×768 pixels when coded, whereas view components of the center view may have 1024×768 pixels when coded. Both the left view texture and depth components may have a resolution of 512×768 pixels, and likewise, both the right view texture and depth components may also have a resolution of 512×768 pixels, while both the center view texture and depth components may have a resolution of 1024×768 pixels. In other examples, other resolutions may be used. Moreover, the downsampling may be in the vertical direction rather than in the horizontal direction. Furthermore, downsampling may occur in both the horizontal and vertical directions, in some examples. Downsampling may include decimation or subsampling, in some examples, where decimation may include combining values of pixels and subsampling may include discarding certain data, e.g., alternate rows and/or columns of pixels.

A parameter set data structure may provide information for a bitstream corresponding to the asymmetric multiview plus depth profile. For example, video encoder 20 may form a sequence parameter set (SPS) conforming to Table 1, as described above. Accordingly, video encoder 20 may signal spatial resolutions of the views in the unit of blocks (e.g., macroblocks or LCUs). In this manner, video decoder 30 may use the signaled spatial resolutions to determine which view has an enhanced vertical or horizontal scale increase. Likewise, video encoder 20 may signal inter-view prediction from one or more low-resolution (that is, reduced resolution) views to an additional high resolution (e.g., a full resolution) view. If additional full resolution views are provided, video encoder 20 may also signal inter-view prediction between the full resolution views.

Accordingly, video decoder 30 may receive a bitstream including some views having reduced resolution pictures and other views having full resolution pictures. Video decoder 30 may decode and upsample pictures of the views having the reduced resolution pictures. Video decoder 30 may then decode the pictures having the full resolution relative to the upsampled pictures.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
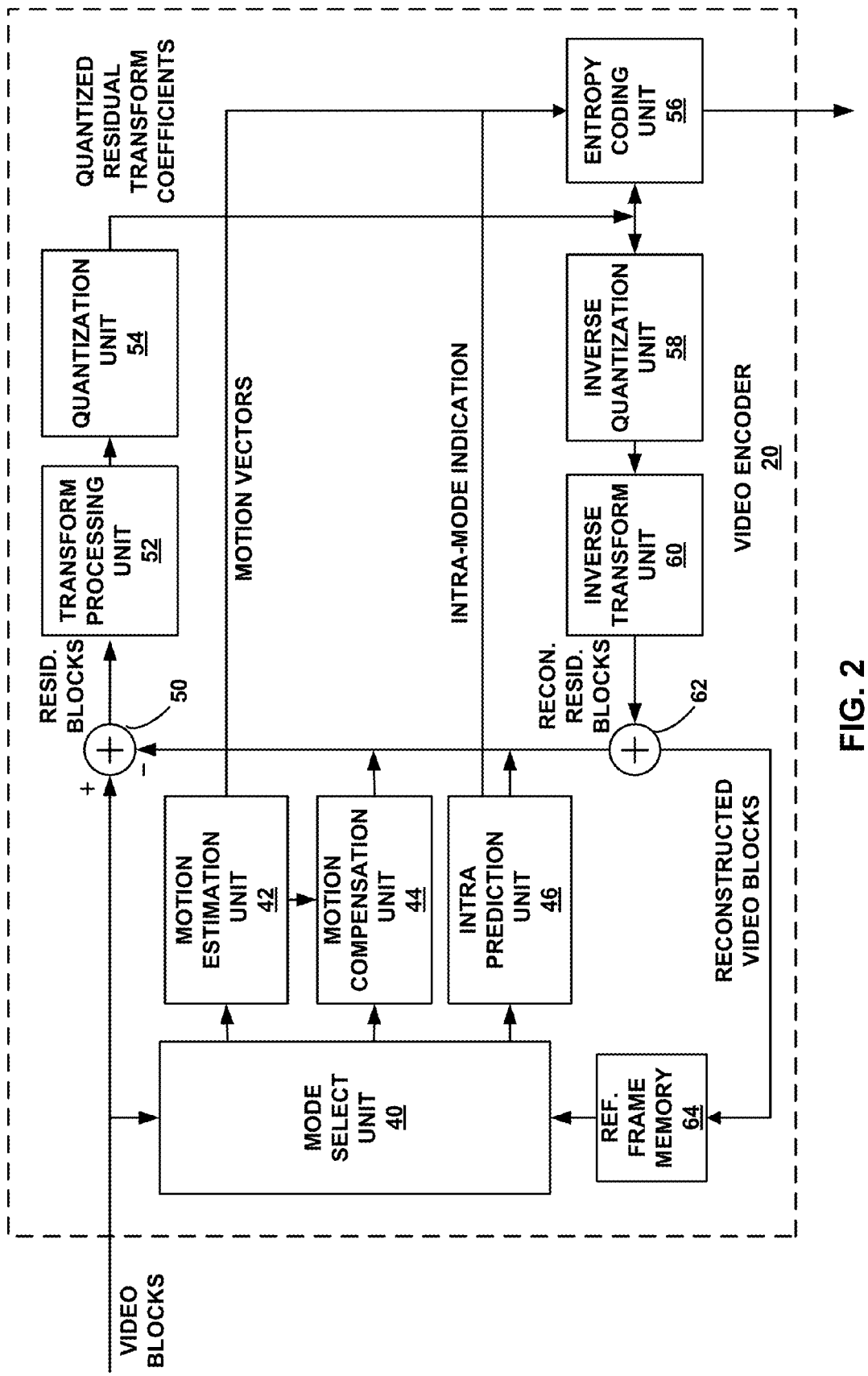
FIG. 2 is a block diagram illustrating an example of a video encoder that may implement techniques for coding multiview video data having asymmetric spatial resolution among the views.

FIG. 2 is a block diagram illustrating an example of video encoder 20 that may implement techniques for coding multi-view video data having asymmetric spatial resolution among the views. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, reference frame memory 64, summer 50, transform processing unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Other types of filters, such as loop filters or sample adaptive offset (SAO) filters may also be used.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. In some examples, mode select unit 40 may also select inter-view prediction, e.g., for a full resolution picture. Mode select unit 40 may select inter-view prediction for a full resolution picture relative to upsampled pictures of reduced resolution views or to other full resolution pictures, in some examples.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame memory 64 may be organized according to these lists.

Motion estimation unit 42 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame memory 64 if no values for sub-integer pixel positions are stored in reference frame memory 64. Motion estimation unit 42 sends the calculated motion vector to entropy coding unit 56 and motion compensation unit 44. The reference frame block identified by a motion vector may be referred to as a predictive block.

Motion estimation unit 42 may further be configured to calculate disparity vectors for use in inter-view prediction. That is, motion estimation unit 42 may calculate disparity for a block of a current frame of a current view with respect to a predictive block of a common temporally-located frame of another view. Thus, motion estimation unit 42 may also be referred to as "motion/disparity estimation unit 42." Likewise, motion compensation unit 44 may be referred to as "motion/disparity compensation unit 44."

In some examples, mode select unit 40 may determine whether a current block, that is, a block currently being coded, corresponds to a texture view component or a depth view component. When the block corresponds to a texture view component and inter-prediction is available, mode select unit 40 may cause motion estimation unit 42 to perform a motion search to calculate a motion vector that identifies a closely matching reference block, as described above. On the other hand, when the block corresponds to a depth view component, mode select unit 40 may instead retrieve the motion vector for a collocated block in a corresponding texture view component and provide this motion vector to motion compensation unit 44. The motion vector may be stored in reference frame memory 64, e.g., in the form of syntax data for the texture view component. Accordingly, mode select unit 40 may retrieve the motion vector for the block from reference frame memory 64. In this manner, video encoder 20 may reuse a motion vector calculated for a block in a texture view component to code a collocated block in a corresponding depth view component.

Motion compensation unit 44 may calculate prediction data based on the predictive block identified by a motion vector. Video encoder 20 forms a residual video block by subtracting the prediction data from motion compensation unit 44 from the original video block being coded. The residual block includes pixel-by-pixel differences between the predictive block and the original block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In accordance with the techniques of this disclosure, video encoder 20 may be configured to downsample pictures of certain views. For example, video encoder 20 may subsample a received picture by extracting alternate rows or alternate columns of the received picture. As another example, video encoder 20 may subsample the received picture using quincunx (or checkerboard) sampling. As yet another example, video encoder 20 may decimate a received picture, which may include mathematically combining rows and/or columns to reduce the spatial resolution of the picture. Alternatively, a video pre-processing unit may be configured to downsample a picture of a particular view. Moreover, video encoder 20 may be configured to encode the downsampled picture.

After subsequently decoding such a downsampled, encoded picture, video encoder 20 may upsample the decoded picture prior to storing the picture in reference frame memory 64. Although not shown, a picture upsampling unit may be provided that receives reconstructed video blocks from summer 62 and that upsamples a picture formed from the reconstructed video blocks for storage in reference frame memory 64. The upsampling procedure may be generally reciprocal to the downsampling procedure, and may include spatial interpolation to calculate values for pixels to upsample the picture to a full resolution.

As discussed above, video encoder 20 may generate a parameter set including information indicative of a spatial resolution of a coded picture, in units of blocks, such as macroblocks or coding units. The parameter set may also include information indicating whether inter-view prediction is available for a particular view, and if so, which views are used for reference. In accordance with the techniques of this disclosure, a full-resolution view may use one or more reduced resolution views (in which case the reduced resolution views may be upsampled to be used for reference, as discussed above) and/or one or more full resolution views for reference for inter-view prediction. The parameter set may include information corresponding to Tables 1 and 2, as discussed above.

Furthermore, video encoder 20 may code both texture view components and depth view components for a view component of a view. In some examples, video encoder 20 may encapsulate coded slices of depth or texture data into respective NAL units, which may be further encapsulated within respective view components, which may in turn be further encapsulated within an access unit. Any or all view components of respective views may include respective texture view components and/or depth view components. The access unit may include all view components for a common temporal instance, e.g., all view components having a particular output (or display) time. In other examples, a separate unit (e.g., an encapsulation unit) may encapsulate encoded video data output by video encoder 20.

In this manner, video encoder 20 represents an example of a video coder configured to downsample a first received picture of a first view having a first resolution to produce a first downsampled picture having a second resolution, wherein the second resolution is lower than the first resolution, downsample a second received picture of a second view having the first resolution to produce a second downsampled picture having the second resolution, encode the first downsampled picture, encode the second downsampled picture, decode the first picture, decode the second picture, upsample the first decoded picture to form a first upsampled picture having the first resolution, upsample the second decoded picture to form a second upsampled picture having the first resolution, and encode a third received picture relative to the first upsampled picture and the second upsampled picture to produce video data of a third coded view, wherein the third received picture has the first resolution.

Figure 3:
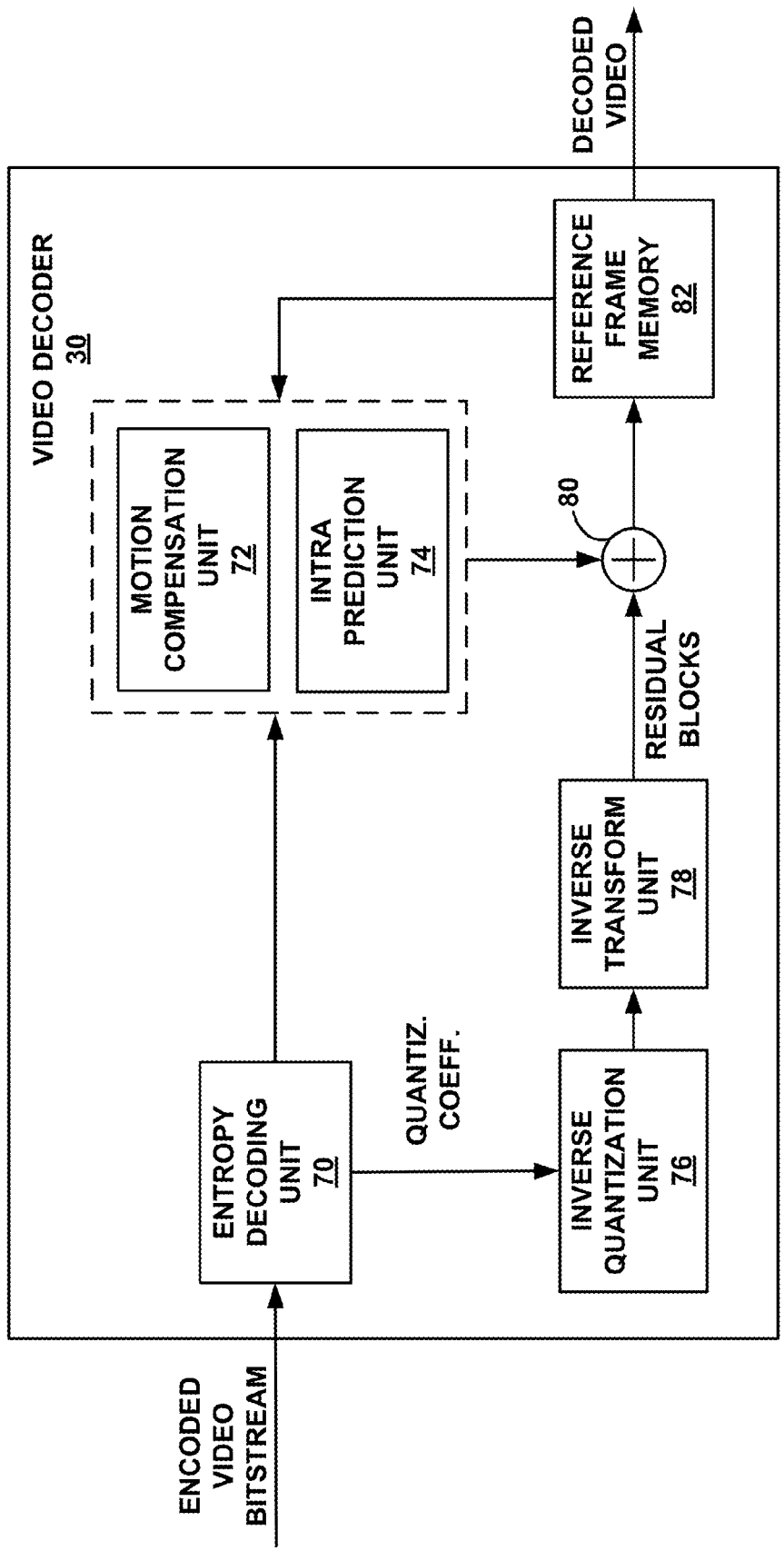
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction block in reference frames in reference frame memory 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 50 for each macroblock to determine a degree of quantization and, likewise, a degree of inverse quantization that should be applied.

Motion compensation unit 72 may further be configured to utilize disparity vectors to perform inter-view prediction, as described above with respect to motion compensation unit 44 of FIG. 2. Thus, motion compensation unit 72 may also be referred to as "motion/disparity compensation unit 72."

In accordance with the techniques of this disclosure, video decoder 30 may be configured to receive signaling data, such as a sequence parameter set (SPS) including information indicating that a sequence of coded pictures is coded using the asymmetric three-dimensional video techniques of this disclosure. For example, the SPS may indicate that the coded video data conforms to an asymmetric three-dimensional video profile of H.264/AVC or HEVC. Upon receiving this data, video decoder 30 may determine that data of the bitstream is formatted according to this profile, and parse and decode the bitstream accordingly.

For example, video decoder 30 may use inter- or intra-prediction to decode encoded pictures of views having a reduced resolution. Video decoder 30 may also upsample the decoded pictures of these views to reproduce pictures having a full resolution. Video decoder 30 may store copies of such full resolution pictures in reference frame memory 82 for use in subsequent inter-prediction or for inter-view prediction of an encoded full resolution picture. In some examples, the SPS may signal spatial resolutions of the views, in the unit of MBs or LCUs.

In some examples, where there are two reduced resolution views followed by a full resolution view, video decoder 30 may determine the locations of reduced resolution view components based on the positions of the view components in an access unit. For example, as shown in FIG. 7B, discussed in greater detail below, video decoder 30 may determine that the first two view components (including respective texture and depth components) correspond to half-resolution views, while the third view component (also including respective texture and depth components) corresponds to a full-resolution view.

Video decoder 30 may also be configured with techniques of this disclosure for reusing motion information of texture view components when decoding depth view components. For example, video decoder 30 may decode a motion vector of a block of a texture view component. Then, video decoder 30 may reuse the motion vector to decode a collocated block in a corresponding depth view component. Accordingly, video decoder 30 need not receive, parse, or decode additional motion information for the block in the depth view component, assuming the block is inter-predicted.

As noted above, video decoder 30 may be configured to perform inter-view prediction as well. For example, video decoder 30 may upsample two decoded, reduced resolution view components, then predict a view component of a third, full resolution view relative to the upsampled view components. Moreover, video decoder 30 may be configured to use inter-view prediction for other full resolution views, relative to previously decoded views or to one or more upsampled reduced resolution views. As noted above, the SPS or other signaling information may indicate which views are potentially inter-view predicted relative to which other views.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (and reference frame lists) for each inter-encoded macroblock or partition, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as display device 32 of FIG. 1).

In this manner, video decoder 30 represents an example of a video coder configured to decode video data of a first coded view to produce a first picture having a first resolution, decode video data of a second coded view to produce a second picture having the first resolution, upsample the first picture to form a first upsampled picture having a second resolution, wherein the second resolution is greater than the first resolution, upsample the second picture to form a second upsampled picture having the second resolution, and decode video data of a third coded view relative to the first upsampled picture and the second upsampled picture to produce a third picture having the second resolution.

Figure 4:
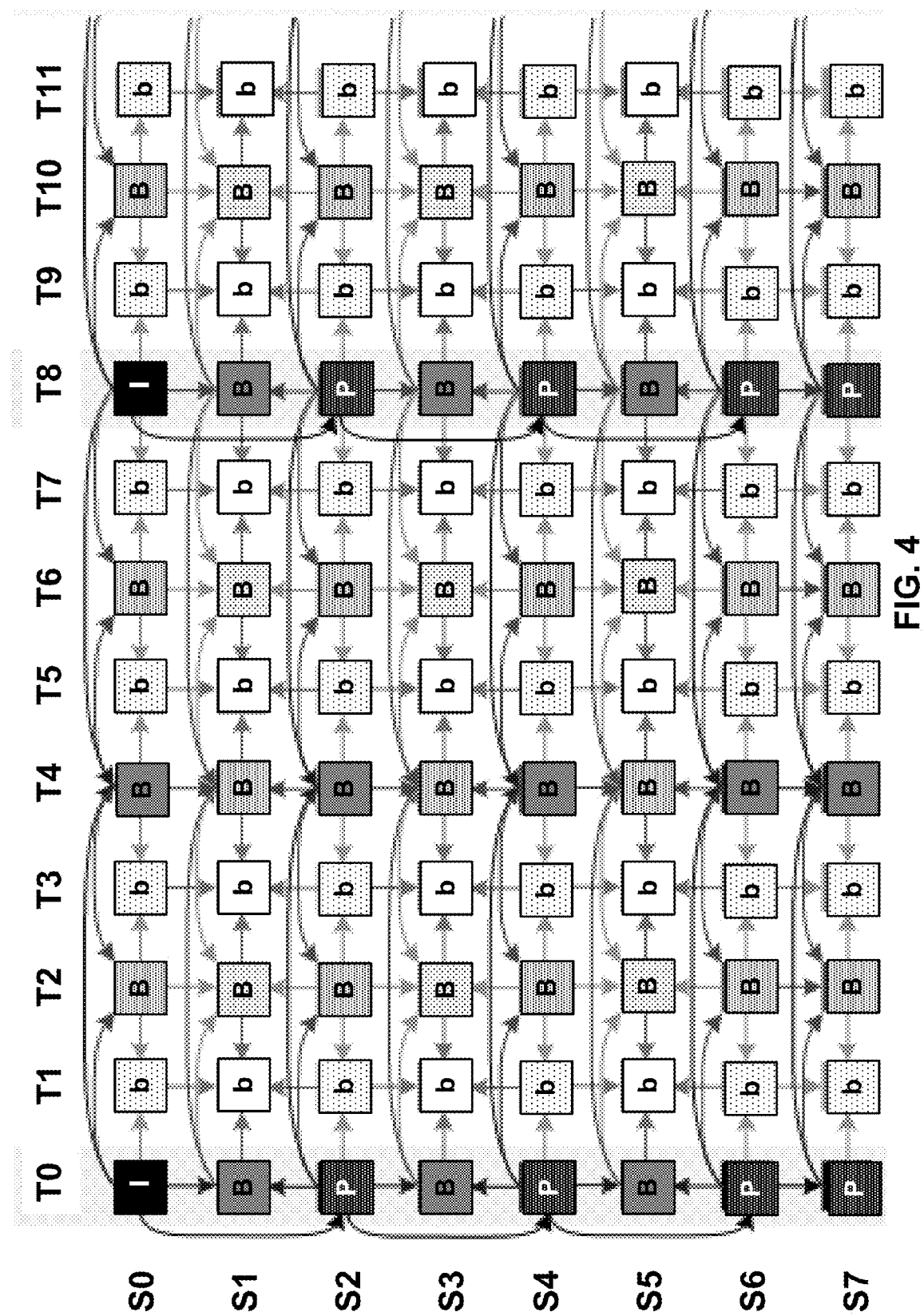
FIG. 4 is a conceptual diagram illustrating an example MVC prediction pattern.

FIG. 4 is a conceptual diagram illustrating an example MVC prediction pattern. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location. FIG. 4 illustrates a typical MVC prediction structure, which may include both inter-picture prediction within each view and inter-view prediction. Predictions are indicated by arrows, where the pointed-to object uses the pointed-from object for prediction reference. In MVC, inter-view prediction may be supported by disparity motion compensation, which may use the syntax of H.264/AVC motion compensation but allows a picture in a different view to be used as a reference picture.

A typical MVC decoding order is time-first coding. That is, each access unit may be defined to contain coded pictures of all the views for one output time instance. For example, an access unit for time T0 may include all of the frames of views S1-S7 at time T0. The decoding order of access units is not necessarily the same as the output or display order.

Coding of two views could be supported also by MVC, and one of the advantages of MVC is that an MVC encoder could take more than two views as a 3D video input and an MVC decoder can decode such a multiview representation. So any renderer with an MVC decoder may expect 3D video content with multiple views. In MVC, inter-view prediction is allowed by allowing prediction among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

Although MVC has a so-called base view, which is decodable by H.264/AVC decoders, a stereo view pair could be supported also by MVC. The advantage of MVC is that it could support an example that uses more than two views as a 3D video input and decodes this 3D video represented by the multiple views. A renderer of a client having an MVC decoder may expect 3D video content with multiple views.

Frames in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multiview video coding video sequence may be predicatively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 4 provides various examples of inter-view prediction. Frames of view S1, in the example of FIG. 4, are illustrated as being predicted from frames at different temporal locations of view S1, as well as inter-view predicted from frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between frames, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 4 are illustrated with full shading, while P-frames have somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. The decoding of the view components shall follow the ascending order of the view order index. If all the views are presented, then the view order indexes are in a consecutive order from zero to one less than the full number of views, i.e., 0 to num_views_minus_1.

In this manner, frames used as reference frames may be decoded before decoding the frames that are encoded with reference to the reference frames.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 4. Also, with respect to the example of FIG. 4, S0>S1, S2>S1, S2>S3, S4>S3, S4>S5, and S6>S5. Any decoding order for the views that does not violate these requirements is possible. Accordingly, many different decoding orders are possible, with only certain limitations.

In conventional 3D video coding, there can be a requirement to support stereo and mono decoding outputting with H.264/AVC (and its extension) decoders. To support coding of the 3-view case multiple view plus depth maps, the overall bandwidth may be high (as measured as the sum of three full-resolution views coded with MVC and their depth maps). Also, the data flow, including the depth maps can be 4.5 times that of the data flow of a corresponding H.264/AVC one-view bitstream.

In accordance with the techniques of this disclosure, some of the views may have reduced resolution pictures while other views may have full resolution pictures coded relative to upsampled versions of the reduced resolution pictures. For example, the pictures of views S0 and S2 may be reduced resolution, e.g., half-resolution. Pictures of view S1 may be full resolution. A video coding device, such as video encoder 20 and/or video decoder 30, may code pictures of view S2 relative to decoded pictures of view S0. The video coding device may upsample decoded pictures of views S0 and S2, then decode pictures of view S1 relative to the upsampled pictures of views S0 and S2. Thus, these techniques may reduce the amount of bandwidth consumed when providing multiple views plus depth in a data flow.

Continuing the example above, each of views S0, S1, and S2 may include both texture and depth components. The texture and depth components of views S0 and S2 may be of half-resolution, whereas the texture and depth components of view S1 may be full resolution. That is, the texture and depth components of views S0 and S2 may have one-half the spatial resolution of the texture and depth components of view S1. Furthermore, view components of views S0 and S2 may be coded using intra- or inter-prediction. As an example, the texture B-picture of view S0 at time T2 may be inter-coded. Thus, blocks of this texture B-picture may be coded using two motion vectors.

Assume for purposes of example that a block in this texture B-picture is coded relative to a reference block in the I-picture of view S0 at time T0 and relative to a reference block in the B-picture of view S0 at time T4. Thus, the block may have a first motion vector for the I-picture at time T0 and a second motion vector for the B-picture at time T4. In accordance with the techniques of this disclosure, a block in the depth component corresponding to (that is, collocated with) the block in the texture B-picture at time T2 in view S0 may be coded using the first and second motion vectors as well, rather than having its own uniquely coded motion vectors. The motion vectors may be used to refer to depth pictures corresponding to the I-picture at time T0 and the B-picture at time T4.

Figure 5A:
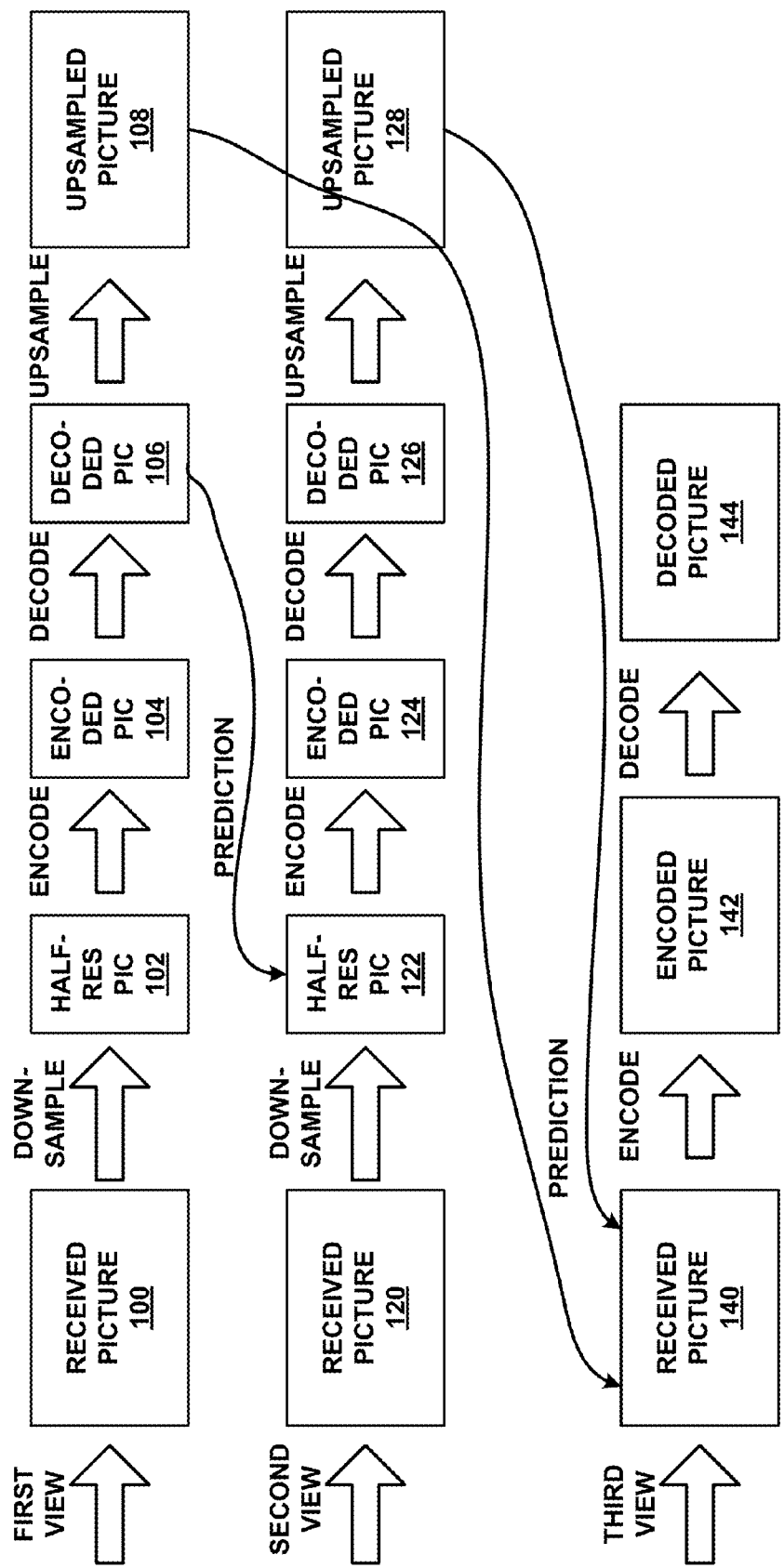
FIGS. 5A and 5B are conceptual diagrams illustrating the inter-view prediction process discussed with respect to FIG. 4 in greater detail.
Figure 5B:
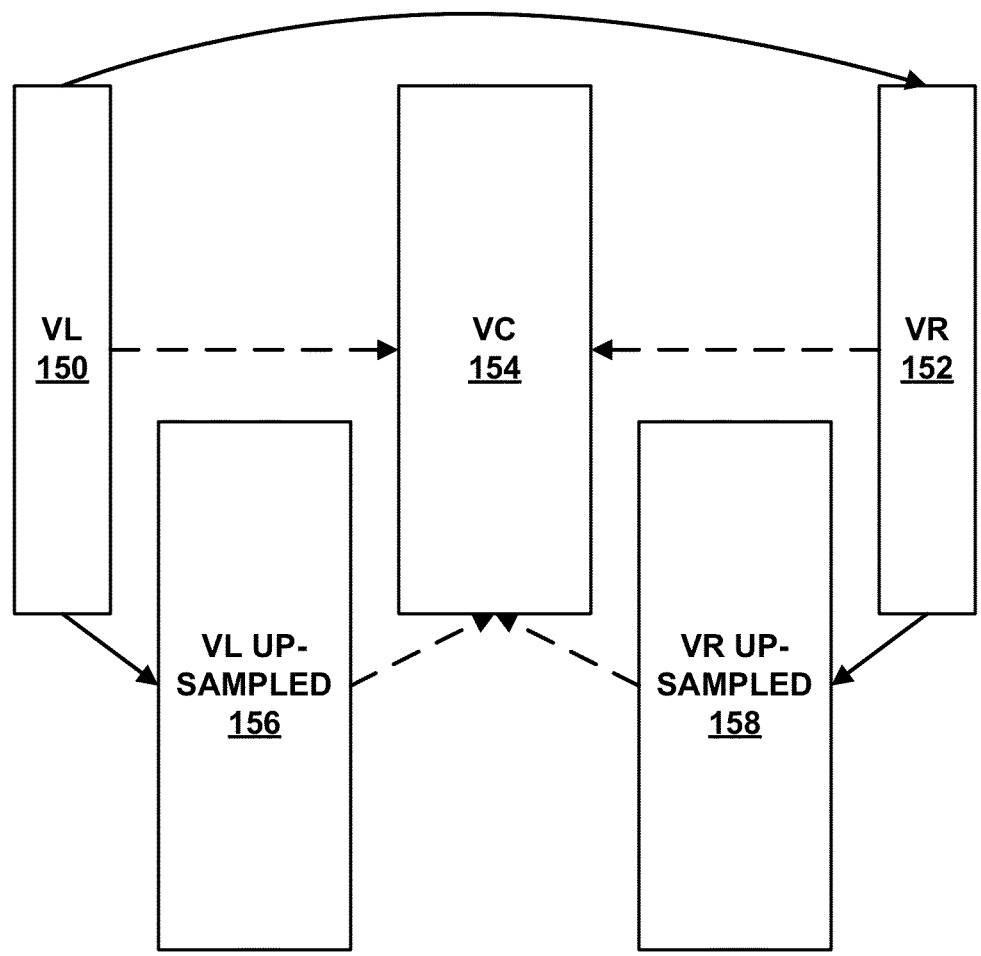

FIGS. 5A and 5B are conceptual diagrams illustrating the inter-view prediction process discussed with respect to FIG. 4 in greater detail. Although described with respect to encoding multiview data, techniques that are substantially similar to those described with respect to FIGS. 5A and 5B may be used to decode the encoded video data. As shown in FIG. 5A, video encoder 20 may receive a picture of a first view, labeled received picture 100. Video encoder 20 may downsample received picture 100 to produce half-resolution picture 102. Video encoder 20 may then encode half-resolution picture 102 to produce encoded picture 104.

As discussed with respect to FIG. 2, video encoder 20 also includes components for decoding encoded pictures, e.g., inverse quantization unit 58, inverse transform unit 60, and summer 62. Thus, video encoder 20 may decode encoded picture 104 to produce decoded picture 106 for use as a reference picture, e.g., for intra-view or inter-view prediction. Moreover, video encoder 20 may upsample decoded picture 106 to produce upsampled picture 108, again for use as a reference picture for, e.g., inter-view prediction for a view having full-resolution pictures.

In a similar manner, video encoder 20 may downsample received picture 120 of a second view to produce half-resolution picture 122. Video encoder 20 may then encode half-resolution picture 122 to produce encoded picture 124. In the example of FIG. 5A, video encoder 20 may predict half-resolution picture 122 relative to decoded picture 106 of the first view, to perform inter-view prediction. Alternatively or additionally, video encoder 20 may perform inter- or intra-prediction of half-resolution picture 122. Video encoder 20 may decode encoded picture 124 to produce decoded picture 126 for use as a reference picture. Likewise, video encoder 20 may upsample decoded picture 126 to produce upsampled picture 128.

Video encoder 20 may further receive a picture of a third view, labeled received picture 140 in the example of FIG. 5A. In this example, video encoder 20 may predict received picture 140 relative to upsampled picture 108 of the first view and upsampled picture 128 of the second view to encode picture 140, producing encoded picture 142. Likewise, video encoder 20 may decode encoded picture 142 to produce decoded picture 144, which video encoder 20 may use as a reference picture to inter-view predict pictures of other full resolution views.

In this manner, the first and second views in FIG. 5A represent examples of reduced resolution views, that is, views having reduced resolution pictures relative to the resolution of received pictures. The third view represents an example of a full resolution view that is predicted relative to upsampled, decoded pictures of reduced resolution views, in this example.

A video decoder, such as video decoder 30, may receive encoded pictures 104, 124, and 142, and perform substantially similar decoding and upsampling tasks as those shown in FIG. 5A. For example, video decoder 30 may decode encoded picture 104 to form decoded picture 106, then upsample decoded picture 106 to form upsampled picture 108. Video decoder 30 may also decoded encoded picture 124 to form decoded picture 126, then upsample decoded picture 126 to form upsampled picture 128. Video decoder 30 may use inter-view prediction, inter-prediction, or intra-prediction when decoding encoded picture 124. Furthermore, video decoder 30 may inter-view predict encoded picture 142 to decode encoded picture 142, to form decoded picture 144. Video decoder 30 may inter-view predict encoded picture 142 relative to upsampled pictures 108, 128 when decoding encoded picture 142. Of course, video decoder 30 may alternative or additionally inter- or intra-predict encoded picture 142 to decode encoded picture 142.

FIG. 5B is another conceptual diagram that illustrates inter-view prediction techniques in accordance with this disclosure. FIG. 5B illustrates a left view (VL), a right view (VR), and a center view (VC), as well as inter-view prediction between these views. The illustrated view components may represent texture or depth view components. In this example, VL component 150 is used to predict VR component 152, and VL component 150 and VR component 152 are used to predict VC component 154. In particular, VL component 150 and VR component 152 have reduced resolutions relative to VC component 154. Therefore, VL component 150 may be upsampled to form VL upsampled component 156 and VR component 152 may be upsampled to form VR upsampled component 158. Thus, VC component 154 may be predicted from VL upsampled component 156 and VR upsampled component 158.

Various filters may be used to upsample VL upsampled component 156 from VL component 150 and VR upsampled component 158 from VR component 152. For example, the H.264/AVC 6-tap upsampling filter may be used. Video decoder 30 may perform such upsampling on-the-fly, such that an extra picture buffer is not needed to store VL upsampled component 156 and VR upsampled component 158.

Figure 6:
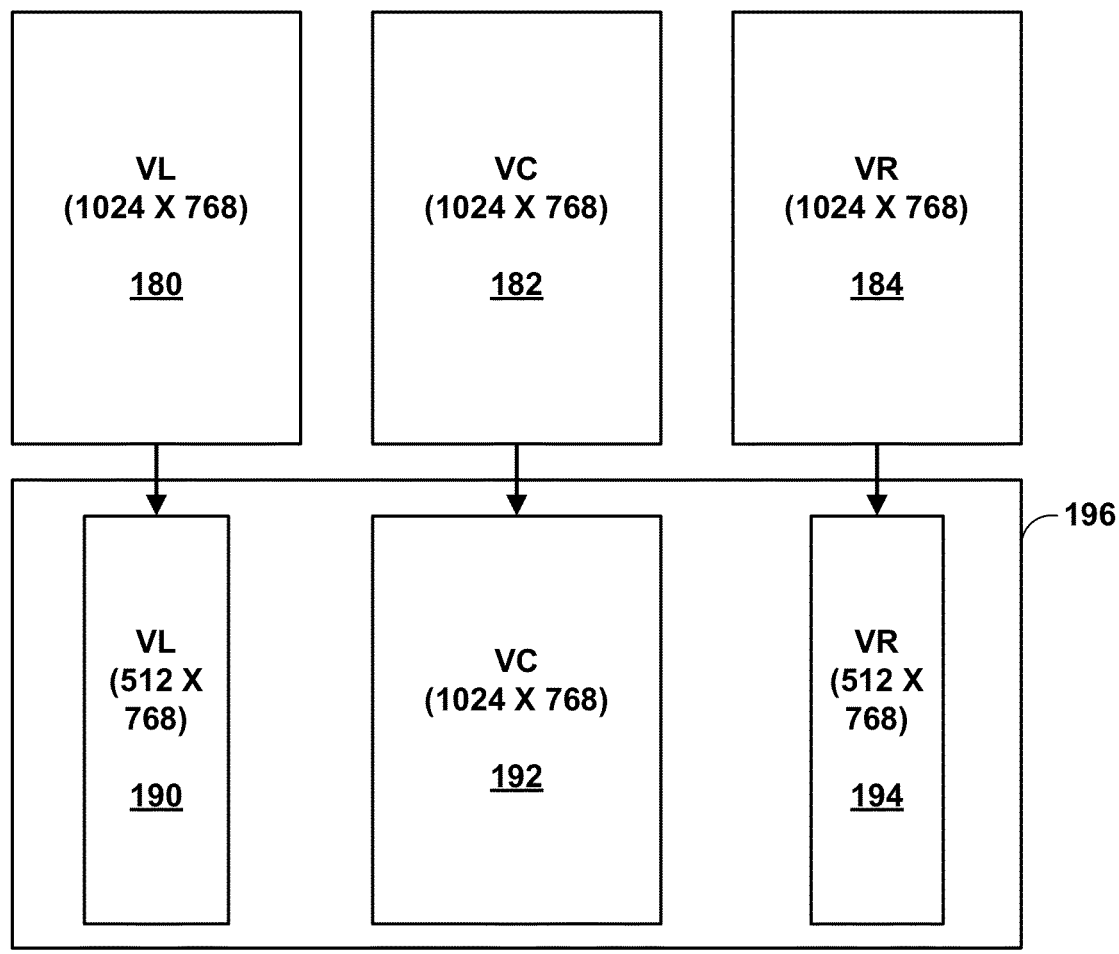
FIG. 6 is a conceptual diagram illustrating an example set of view components being prepared for coding.

FIG. 6 is a conceptual diagram illustrating an example set of view components being prepared for coding, e.g., by video encoder 20. In this example, VL component 180 has a spatial resolution of 1024×768 pixels, VC component 182 has a spatial resolution of 1024×768 pixels, and VR component 184 has a spatial resolution of 1024×768 pixels. Video encoder 20 may downsample VL component 180 to form VL component 190 having a spatial resolution of 512×768 and downsample VR component 194 to form VR component 194 having a spatial resolution of 512×768. Video encoder 20 need not downsample VC component 182, and therefore, may code VC component 192 having a spatial resolution equal to the spatial resolution of VC component 182 (in this example, 1024×768). It should be noted that in various examples, components may be downsampled in either the horizontal or vertical direction, or both. Video encoder 20, or another component, may encapsulate VL component 190, VR component 194, and VC component 192 in access unit 196.

In this example, VL component 190 has one-half of the spatial resolution of VL component 180 as received. Likewise, VR component 194 has one-half of the spatial resolution of VR component 194 as received, in this example. Thus, video encoder 20 may encode VL component 190 and VR component 194, having reduced spatial resolutions relative to the corresponding components as received. However, video encoder 20 may encode VC component 192 having a full resolution, that is, the same resolution as VC component 182 as received. Although depth maps are not illustrated in FIGS. 5A, 5B, and 6, it should be understood that the view components may include both texture components and depth components, and that the depth components may have the same spatial resolution as the corresponding texture components in the same view components.

In accordance with the techniques of this disclosure, video encoder 20 (or another element of source device 12) may encode views of video data according to new profiles "multiview depth profile" and/or "asymmetric multiview depth profile." A bitstream may include four sequence parameter sets (SPS) in accordance with the techniques of this disclosure, any combination of these four SPSs, or conceptually similar signaling data, in various examples:

The AVC SPS, used by the base view, texture view components;

The subset SPS, with a profile of stereo high, used for the low-resolution texture view components in the context of MVC decoding;

The subset SPS, with a profile of, e.g., "multiview depth profile," to be used by depth view components (of the lower-resolution) in the context of 3VD (multiview video plus depth) decoding. In terms of syntax elements, it is a superset of the subset SPS with a stereo high profile, meaning that it includes all the syntax elements as specified in an H.264/AVC SPS, the SPS MVC extension, and further extension related to the sequence level characteristics of the depth maps, for example, they might have different view dependency and this is to be signaled; and/or The subset SPS, with a profile of, e.g., "asymmetric multiview depth profile," to be used by depth view components with a full-resolution, in the context of 3DV (multiview video plus depth) decoding. In terms of syntax elements, this SPS is a superset of the SPS with a stereo high profile, or multiview high profile, or "multiview depth profile," meaning that it includes all the syntax elements as specified in an H.264/AVC SPS, the SPS MVC extension for the texture view components with half-resolution, the characteristics, for the half-resolution depth sequences, e.g., possibly view dependency, and the characteristics of the additional views, including the view dependency of those views. In the SPS, the width (or the height) as signaled in unit of MB (macroblock) size is twice as the width (or the height) signaled in the other SPSs, if the half-resolution views were down-sampled in the horizontal (or vertical) direction.

Table 1 below illustrates an example of the subset SPS with an "asymmetric multiview depth profile." The subset SPS may have the syntax elements of Table 1 as a further SPS asymmetric depth extension, after the SPS MVC extension:

TABLE 1

| seq_parameter_set_asym_3DV_extension( ) { | C | Descriptor |
|---|---|---|
| additional_view_flag | 0 | u(1) |
| if(additional_view_flag) | | |
|   num_additional_views_minus1 | 0 | ue(v) |
| for( i = 0; i <= num_addtional_views_minus1; i++ ) | | |
|   view_id[ i ] | 0 | ue(v) |
| for( i = 0; i <= num_addtional_views_minus1; i++ ) { | | |
|   add_num_anchor_refs_l0[ i ] | 0 | ue(v) |
|   for( j = 0; j < num_anchor_refs_l0[ i ]; j++ ) | | |
|     add_anchor_ref_l0[ i ][ j ] | 0 | ue(v) |
|   add_num_anchor_refs_l1[ i ] | 0 | ue(v) |
|   for( j = 0; j < num_anchor_refs_l1[ i ]; j++ ) | | |
|     add_anehor_ref_l1[ i ][ j ] | 0 | ue(v) |
| } | | |
| for( i = 1; i <= num_views_minus1; i++ ) { | | |
|   add_num_non_anchor_refs_l0[ i ] | 0 | ue(v) |
|   for( j = 0; j < num_non_anchor_refs_l0[ i ]; j++ ) | | |
|     add_non_anchor_ref_l0[ i ][ j ] | 0 | ue(v) |
|   add_num_non_anehor_refs_l1[ i ] | 0 | ue(v) |
|   for( j = 0; j < num_non_anchor_refs_l1[ i ]; j++ ) | | |
|     add_non_anchor_ref_l1[ i ][ j ] | 0 | ue(v) |
| } | | |
| // syntax elements to describe the characteristics of the relevant depth maps | | |
| disable_inter_view_pred_depth_flag | 0 | u(1) |
| ... | | |
| } | | |

These syntax elements may have the following semantics:

additional_view_flag may indicate whether there is any additional views with a resolution higher than the resolution in the AVC or MVC compliant sub-bitstreams.

num_additional_views_minus1 plus 1 may specify the number of additional views with a higher resolution. It may be inferred to be −1 when not specified.

view_id[i] specifies the view_id of the view with additional view order index equal to i.

add_num_anchor_refs_l0[i] may specify the number of view components for inter-view prediction in the initialised RefPicList0 in decoding anchor view components with additional view order index equal to i.

add_anchor_ref_l0[i][j] may specify the view_id of the j-th view component for inter-view prediction in the initialised RefPicList0 in decoding anchor view components with additional view order index equal to i.

add_num_anchor_refs_l1[i] may specify the number of view components for inter-view prediction in the initialised RefPicList1 in decoding anchor view components with additional view order index equal to i.

add_anchor_ref_l1[i][j] may specify the view_id of the j-th view component for inter-view prediction in the initialised RefPicList1 in decoding an anchor view component with additional view order index equal to i.

add_num_non_anchor_refs_l0[i] may specify the number of view components for inter-view prediction in the initialised RefPicList0 in decoding non-anchor view components with additional view order index equal to i.

add_non_anchor_ref_l0[i][j] may specify the view_id of the j-th view component for inter-view prediction in the initialised RefPicList0 in decoding non-anchor view components with additional view order index equal to i.

add_num_non_anchor_refs_l1[i] may specify the number of view components for inter-view prediction in the initialised RefPicList1 in decoding non-anchor view components with additional view order index equal to i.

add_non_anchor_ref_l1[i][j] may specify the view_id of the j-th view component for inter-view prediction in the initialised RefPicList1 in decoding non-anchor view components with additional view order index equal to i.

disable_inter_view_pred_depth_flag equal to 0 may indicate the depth view components have the same inter-view prediction structure as that of the texture view components; this flag equal to 1 indicates that inter-view prediction for depth maps are disabled for the signaled views (which may be either the additional views or all the views in the coded video sequence).

The seq_parameter_set_asym_3DV_extension SPS may be contained in the subset SPS RBSP, as indicated in Table 2 below:

TABLE 2

| subset_seq_parameter_set_rbsp( ) { | C | Descriptor |
|---|---|---|
| seq_parameter_set_data( ) | 0 | |
| if( profile_idc = = 83 || profile_idc = = 86 ) { | | |
|   seq_parameter_set_svc_extension( ) /* specified in Annex G */ | 0 | |
|   svc_vui_parameters_present_flag | 0 | u(1) |
|   if( svc_vui_parameters_present_flag = = 1 ) | | |
|     svc_vui_parameters_extension( ) /* specified in Annex G */ | 0 | |
| } else if( profile_idc = = 118 || profile_idc == 3DV_profile ) { | | |
|   bit_equal_to_one /* equal to 1 */ | 0 | f(1) |
|   seq_parameter_set_mvc_extension( ) /* specified in Annex H */ | 0 | |
|   if (profile_idc = = asym_multiview_depth_profile) | | |
|     seq_parameter_set_asym_3DV_extension ( ) /* specified in Annex I */ | | |
|   mvc_vui_parameters_present_flag | 0 | u(1) |
|   if( mvc_vui_parameters_present_flag = = 1 ) | | |
|     mvc_vui_parameters_extension( ) /* specified in Annex H */ | 0 | |
| } | | |
| additional_extension2_flag | 0 | u(1) |
| if( additional_extension2_flag = = 1 ) | | |
|   while( more_rbsp_data( ) ) | | |
|     additional_extension2_data_flag | 0 | u(1) |
| rbsp_trailing_bits( ) | | |
| } | | |

In this manner, when the profile indicator (profile_idc) of the subset sequence parameter set indicates that the profile for the corresponding sequence conforms to the asymmetric multiview depth profile, the subset sequence parameter set may further include information corresponding to the sequence parameter set asymmetric three-dimensional video extension, such as the information described with respect to Tables 1 and 2. As shown in Table 2, the "additional_extension1_flag" of conventional H.264/AVC is renamed to be "bit_equal_to_one" in this example extension. Furthermore, "additional_extension2_data_flag" is added as part of this example extension, to enable further extensibility, carried by data corresponding to the additional_extension2_data_flag. Because of the changes to the subset SPS of conventional H.264/AVC (and specifically, the MVC extension of H.264/AVC), the subset SPS of this disclosure may be referred to as a "new subset SPS." Alternatively, the subset SPS of this disclosure may be referred to as a modified subset SPS, e.g., a modified version of the subset SPS of the MVC extension of H.264/AVC.

Figure 7A:
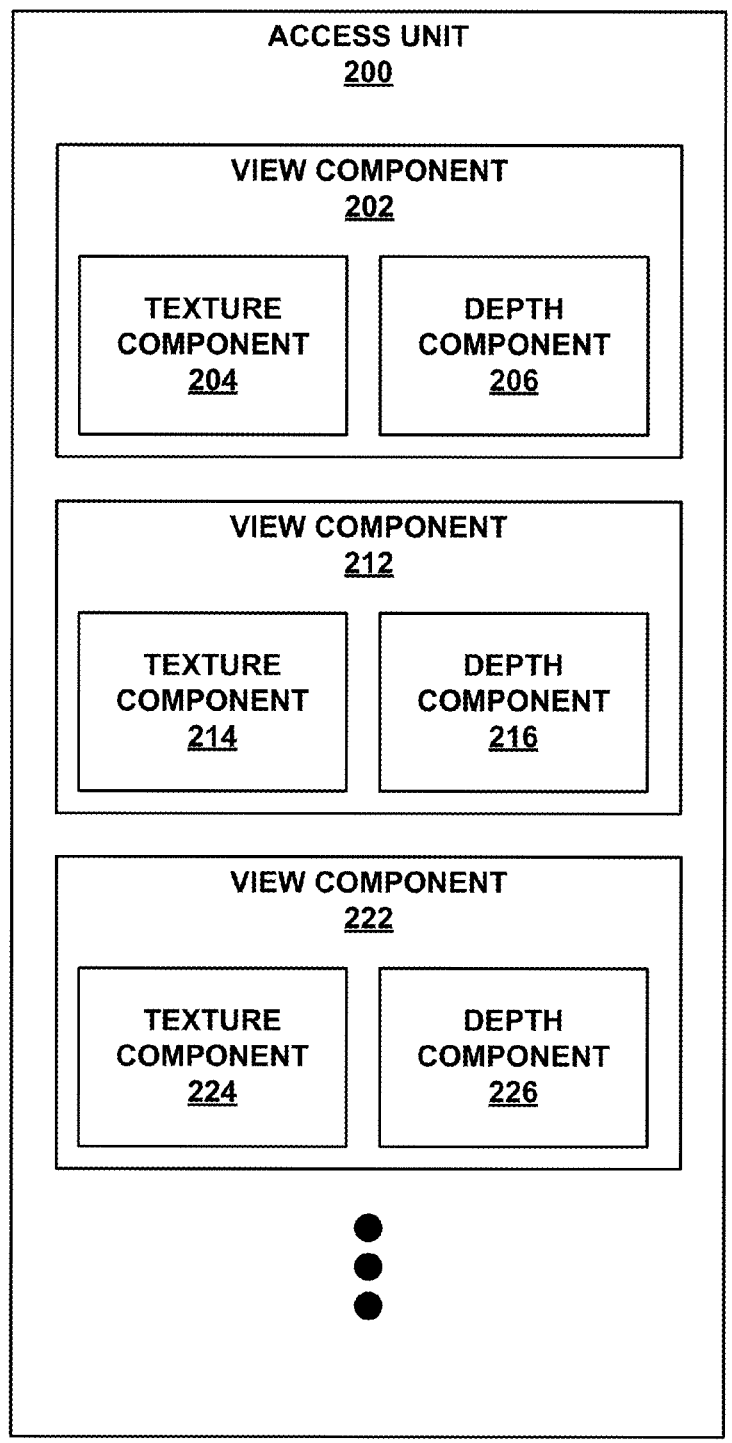
FIGS. 7A and 7B are conceptual diagrams illustrating examples of access unit structures in a bitstream.
Figure 7B:
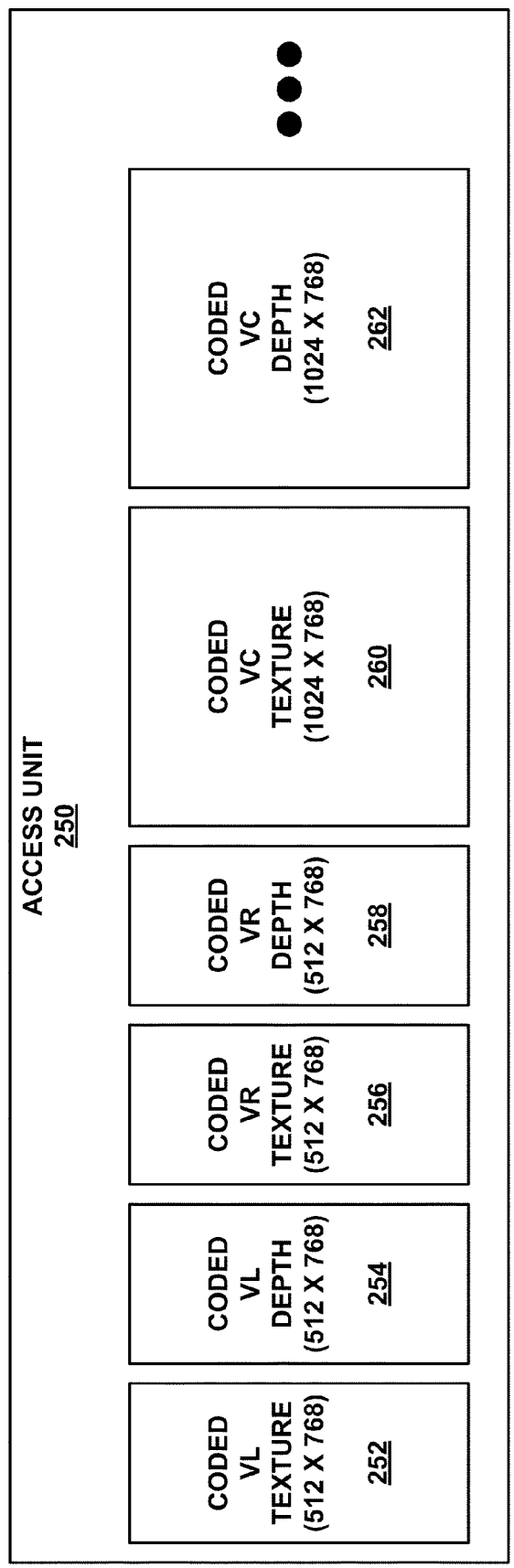

FIGS. 7A and 7B are conceptual diagrams illustrating examples of access unit structures in a bitstream. In the example of FIG. 7A, access unit 200 includes view component 202 corresponding to a first view, view component 212 corresponding to a second view, and view component 222 corresponding to a third view. View component 202 includes texture component 204 and depth component 206, view component 212 includes texture component 214 and depth component 216, and view component 222 includes texture component 224 and depth component 226. In general, texture component 204 has the same spatial resolution as depth component 206, texture component 214 has the same spatial resolution as depth component 216, and texture component 224 has the same spatial resolution as depth component 226.

View components 202 and 212 may correspond to reduced resolution views. Therefore, texture component 204 and depth component 206 may have reduced resolutions, e.g., half resolutions. Likewise, texture component 214 and depth component 216 may also have reduced resolutions, e.g., half resolutions. View component 222 may correspond to a full resolution view, and therefore, texture component 224 and depth component 226 may have full resolutions. Moreover, texture component 224 may be coded such that prediction data for texture component 224 includes at least a portion of an upsampled version of texture component 204 and at least a portion of an upsampled version of texture component 214. Likewise, depth component 226 may be coded such that prediction data for depth component 226 includes at least a portion of an upsampled version of depth component 206 and a portion of an upsampled version of depth component 216.

FIG. 7B is a conceptual diagram illustrating another example of an access unit 250. In this example, access unit 250 includes coded VL texture component 252, coded VL depth component 254, coded VR texture component 256, coded VR depth component 258, coded VC texture component 260, and coded VC texture component 262. Components 252, 254, 256, and 258 have half-resolutions (512×768, in this example), while components 260 and 262 have full resolutions (1024×768, in this example). Components 252 and 254 correspond to a left view, components 256 and 258 correspond to a right view, and components 260 and 262 correspond to a center view, in this example.

An access unit may include M+N view components, where M is an integer that represents the number of half-resolution views and N is an integer that represents the number of full-resolution views. In the examples of FIGS. 7A and 7B, M is equal to or greater than two, and N is equal to or greater than one. Each view in these examples includes a texture component and a depth component, and the depth component for a view may follow the texture component for the same view immediately in the bitstream.

By providing the information (e.g., the SPS data structures) of this disclosure, as well as the access unit arrangement, a device may perform sub-bitstream extraction. For example, video decoder 30, destination device 14, or another device (such as a router of a content delivery network) may extract a sub-bitstream from a full bitstream including data for a plurality of views according to the techniques of this disclosure. The device may extract an MVC-compliant bitstream or a stereo view plus depth sub-bitstream from the full bitstream.

In extracting a stereo sub-bitstream or stereo video plus depth sub-bitstream, the sub-bitstream would not necessarily contain asymmetric resolution, assuming the sub-bitstreams are extracted from views having the same resolution. Therefore, it is not necessary to extract a subset SPS with a "seq_parameter_set_asym_3DV_extension," nor is it necessary for the extracting device to provide this information to, e.g., video decoder 30. When video decoder 30 does not receive this information, if view components target for output do not have a higher resolution than the base view, the extracting device may also discard the subset SPS with a profile of asym_multiview_depth_profile.

Figure 8:
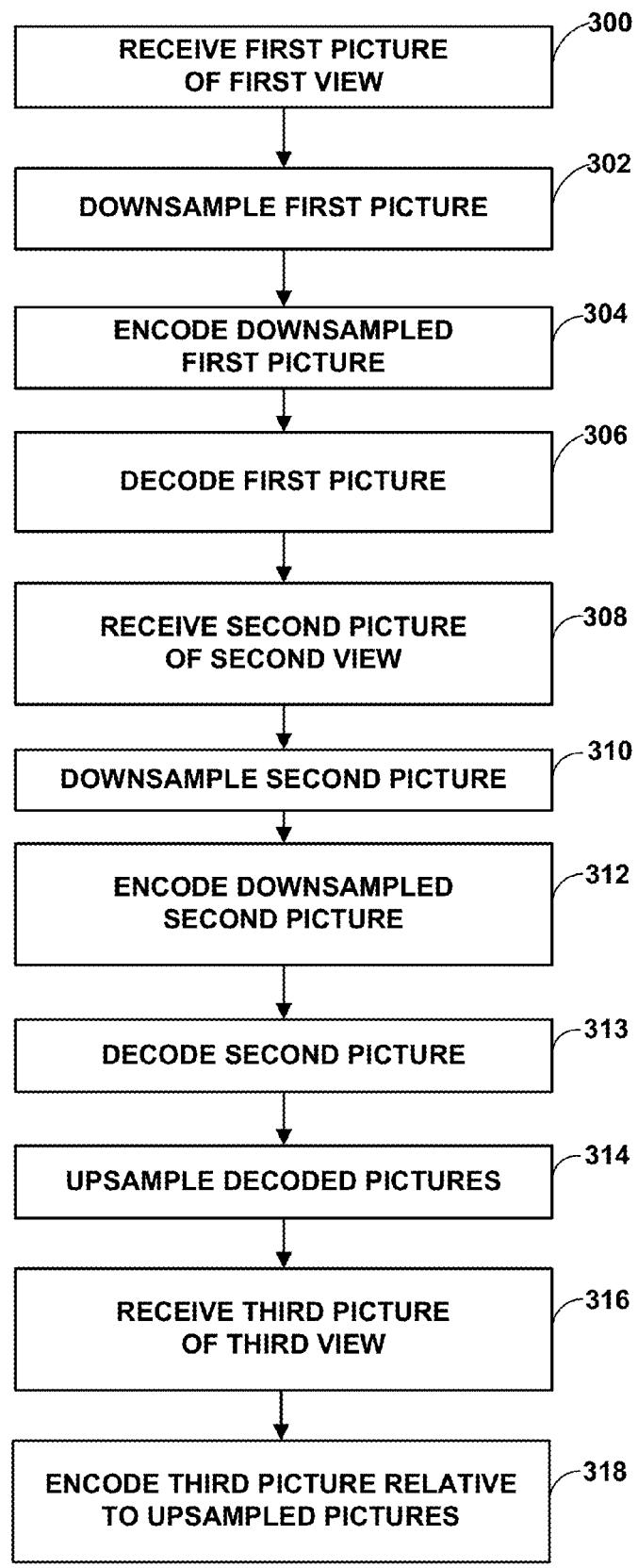
FIG. 8 is a flowchart illustrating an example video encoding method in accordance with the techniques of this disclosure.

FIG. 8 is a flowchart illustrating an example video encoding method in accordance with the techniques of this disclosure. Video encoder 20 may receive a first picture of a first view (300). For example, video encoder 20 may receive a first picture having a particular resolution. Video encoder 20 may then downsample the first picture (302) to a reduced resolution, e.g., half-resolution. Video encoder 20 may reduce the resolution in the horizontal direction, the vertical direction, or both. Video encoder 20 may then encode the downsampled first picture (304). Video encoder 20 may also decode the first picture, e.g., for use as a reference picture (306).

Video encoder 20 may also receive a second picture of a second view (308). The second picture may have the same initial resolution as that of the first picture. Video encoder 20 may similarly downsample the second picture (310) to the reduced resolution, e.g., half resolution. Video encoder 20 may further encode the downsampled second picture (312). In some examples, video encoder 20 may encode the downsampled second picture relative to the decoded first picture using inter-view prediction. Alternatively or additionally, video encoder 20 may encode the downsampled second picture using intra-prediction or inter-prediction. Furthermore, video encoder 20 may decode the second picture for use as a reference picture (313), which may include decoding the second picture relative to the decoded first picture.

Video encoder 20 may also upsample the decoded first and second pictures (314). Video encoder 20 may also receive a third picture of a third view (316). The third picture may have the same initial resolution as that of the first and second pictures. However, rather than downsampling the resolution of the third picture, video encoder 20 may encode the third picture relative to the upsampled first and second pictures (318) using inter-view prediction. Of course, in other examples, video encoder 20 may additionally or alternatively encode the third picture relative to only one upsampled picture using inter-view prediction, or using inter- or intra-prediction. In addition, video encoder 20 may encode pictures of additional views using inter-prediction, intra-prediction, and/or inter-view prediction.

Video encoder 20, or another device associated with video encoder 20, may also be configured to construct the SPS data structures described above to indicate, for example, spatial resolutions of the views and/or how the views are predicted relative to one another. Moreover, the pictures may include either or both of texture and/or depth information for the respective views. As noted above, when encoding and decoding depth components using inter-prediction, video encoder 20 may reuse motion information calculated for blocks of a corresponding texture component to encode and decode collocated blocks of the depth component.

In this manner, the method of FIG. 8 represents an example of a method including downsampling a first received picture of a first view having a first resolution to produce a first downsampled picture having a second resolution, wherein the second resolution is lower than the first resolution, downsampling a second received picture of a second view having the first resolution to produce a second downsampled picture having the second resolution, encoding the first downsampled picture, encoding the second downsampled picture, decoding the first picture, decoding the second picture, upsampling the first decoded picture to form a first upsampled picture having the first resolution, upsampling the second decoded picture to form a second upsampled picture having the first resolution, and encoding a third received picture relative to the first upsampled picture and the second upsampled picture to produce video data of a third coded view, wherein the third received picture has the first resolution.

Figure 9:
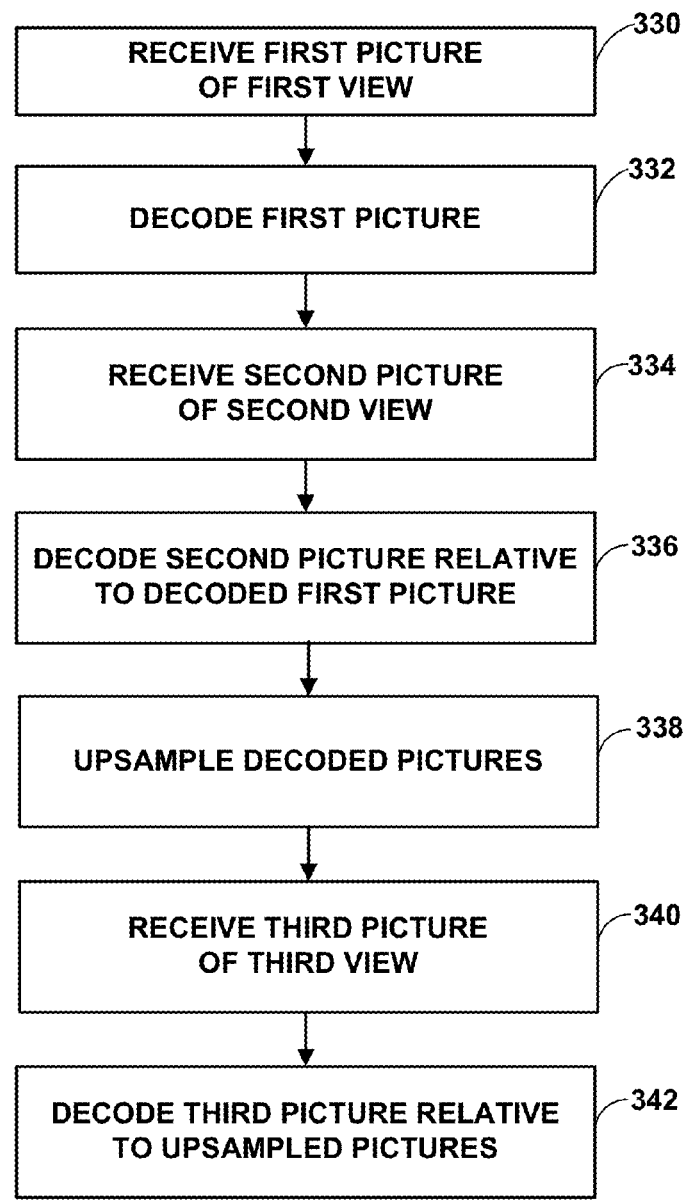
FIG. 9 is a flowchart illustrating an example video decoding method in accordance with the techniques of this disclosure.

FIG. 9 is a flowchart illustrating an example video decoding method in accordance with the techniques of this disclosure. The decoding method may be performed wholly or in part by video decoder 30. In this example, video decoder 30 may receive a first picture of a first view (330). The first picture may have a reduced resolution relative to a full resolution. For example, video decoder 30 may receive signaling data indicating that the resolution of the first picture is lower than the resolution of another picture. As an example, the signaling data may be included in an SPS that indicates that the first picture has one-half the spatial resolution of another, full resolution picture, e.g., in units of macroblocks or LCUs. Video decoder 30 may decode the first picture (332).

Video decoder 30 may also receive a second picture of a second view (334). The second picture may also have the reduced resolution of the first picture, e.g., half-resolution relative to the full resolution. Video decoder 30 may decode the second picture (336). In some examples, video decoder 30 may decode the second picture relative to the decoded first picture, using inter-view prediction. Of course, video decoder 30 may alternatively or additionally decode the second picture using inter-prediction or intra-prediction. Video decoder 30 may receive mode information indicating whether to decode a particular block of a picture using intra-prediction, inter-prediction, and/or inter-view prediction. Furthermore, signaling data may indicate whether a picture of a particular view can be inter-view predicted relative to one or more other views. For example, the signaling data may indicate that the second view may be inter-view predicted relative to the first view.

Video decoder 30 may also upsample the decoded first and second pictures (338). For example, video decoder 30 may upsample the decoded first and second pictures based on the signaling data described above, indicating that the first and second pictures have reduced resolutions. To upsample the first and second pictures, video decoder 30 may interpolate pixel values for alternate columns of the pictures when the pictures have a reduced resolution in the horizontal direction or alternate rows of the pictures when the pictures have a reduced resolution in the vertical direction. When the pictures have reduced resolutions in the horizontal and vertical directions, video decoder 30 may first interpolate values in the horizontal direction followed by the vertical direction, or may first interpolate values in the vertical direction followed by the horizontal direction.

Video decoder 30 may also receive a third picture of a third view (340), which video decoder 30 may decode relative to the upsampled first and second pictures (342). The signaling data may indicate that the third picture has a full resolution, and therefore, video decoder 30 need not upsample the third picture. Moreover, video decoder 30 may determine, from the signaling data, that the third picture is inter-view predicted relative to the first view and the second view. Thus, video decoder 30 may use the upsampled first and second pictures as reference pictures for performing inter-view prediction to decode the third picture of the third view. In this manner, the third picture of the third view may have a full resolution as received, while the first and second pictures may have reduced resolutions (e.g., relative to the resolution of the third picture) as received. The first and second pictures as received may have one-half of the resolution of the third picture as received in the horizontal or vertical direction, in some examples.

As noted above, the pictures may comprise texture or depth view components. Video decoder 30 may use a similar process for both texture and depth view components as the method of FIG. 9. For example, video decoder 30 may first decode texture view components using this method, followed by depth view components using this method. Alternatively, video decoder 30 may decode a texture view component of a first view followed by a corresponding depth view component of the first view, then a texture view component of a second view followed by the corresponding depth view component of the second view, and so on.

In some examples, video decoder 30 may decode motion information signaled for a block of video data for a texture view component during decoding of the texture view component. The motion information may comprise, for example, a list indicator (e.g., list 0, list 1, or a combined list), a reference picture index that identifies a corresponding reference picture in the indicated list, a horizontal component, and a vertical component.

The horizontal and vertical components may comprise difference values to be applied to a motion vector predictor. The motion vector predictor may correspond to a motion vector of a spatially neighboring block, a temporally collocated block, or a collocated block in a different view, in various examples. Video decoder 30 may determine the motion vector predictor implicitly using a prescribed selection scheme (such as calculating the median of the motion vectors from a set of motion vector candidates) or explicitly (such as by receiving information that indicates the location of the motion vector predictor). Video decoder 30 may then decode the motion vector of the current block by adding the horizontal difference value to the horizontal component of the motion vector predictor and the vertical difference value to the vertical component of the motion vector predictor.

In some examples, rather than decoding motion information for a block of a depth component in addition to motion information for a corresponding block of a texture component, video decoder 30 may reuse motion information decoded for a block of a texture component to decode a corresponding block of a depth component. For example, video decoder 30 may decode motion information for a block of a texture component. Then, video decoder 30 may use the decoded motion information to decode a collocated block in a corresponding depth component. In this manner, no additional motion information need be signaled for the block of the depth component.

In this manner, the method of FIG. 9 represents an example of a method including decoding video data of a first coded view to produce a first picture having a first resolution, decoding video data of a second coded view to produce a second picture having the first resolution, upsampling the first picture to form a first upsampled picture having a second resolution, wherein the second resolution is greater than the first resolution, upsampling the second picture to form a second upsampled picture having the second resolution, and decoding video data of a third coded view relative to the first upsampled picture and the second upsampled picture to produce a third picture having the second resolution.

Figure 10:
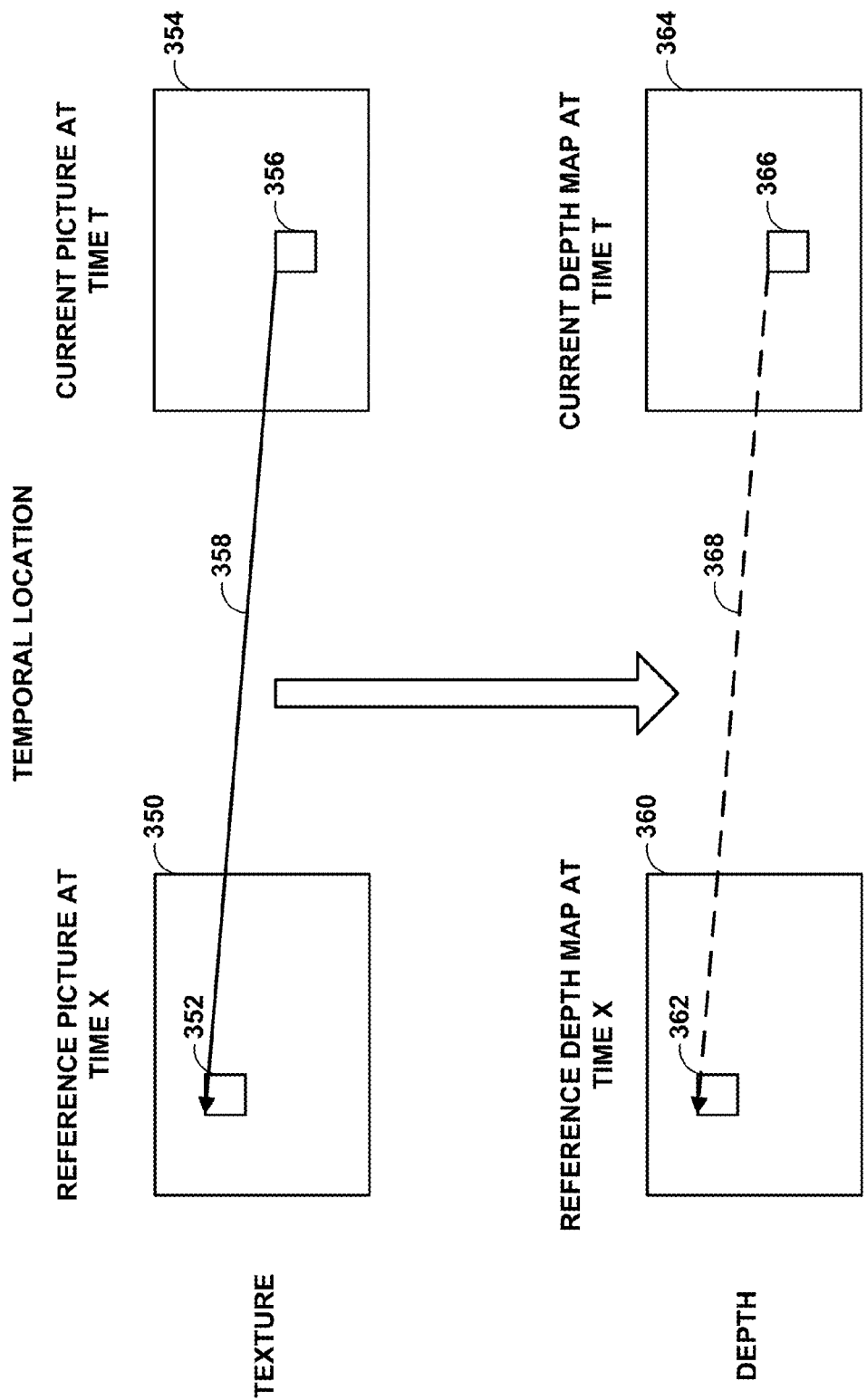
FIG. 10 is a conceptual diagram illustrating reuse of a motion vector between a texture view component and a depth view component.

FIG. 10 is a conceptual diagram illustrating reuse of a motion vector between a texture view component and a depth view component. The example of FIG. 10 shows texture and depth components at various temporal locations. Specifically, picture 354 represents an example of a texture view component at temporal location T. Picture 354 includes block 356 that is predicted relative to reference block 352 of picture 350, where picture 350 represents an example of a texture view component at temporal location X. Temporal location X may occur earlier or later than temporal location T, but picture 350 may be decoded before picture 354.

Coded data for block 356 may include motion information defining motion vector 358, which indicates the location of reference block 352. For example, the motion information may include a list indicator, a reference picture index, a horizontal component, a vertical component, and potentially an explicit indication of a motion vector predictor. Accordingly, this motion information may be signaled for block 356.

FIG. 10 further illustrates depth map 364, which corresponds to picture 354. That is, depth map 364 and picture 354 both occur at temporal location T. Thus, a common view component may include both a texture view component corresponding to picture 354 and a depth view component corresponding to depth map 364. Similarly, FIG. 10 illustrates depth map 360, which corresponds to picture 350. Block 366 of depth map 364 is collocated with block 356 in corresponding picture 354, in this example.

In accordance with the techniques of this disclosure, a video coder (such as video encoder 20 and/or video decoder 30) may reuse motion information of block 356 when coding collocated block 366. Thus, motion information need not be signaled for block 366. Instead, the motion information signaled for block 356 may be used to decode block 366, which is collocated with block 356 in a corresponding depth map 364. This reuse of motion information is represented by the arrow between motion vector 358 and motion vector 368. Thus, the motion information also defines motion vector 368, which is illustrated using a dashed line to indicate that no additional motion information need be signaled to produce motion vector 368. Motion vector 368 indicates the location of reference block 362 of depth map 360, which is accordingly collocated with reference block 352 of corresponding picture 350.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
decoding video data of a first coded view that comprises a first view component comprising a first texture component having the first resolution and a first depth component having the first resolution to produce a first picture having the first resolution at least in part by:

predicting a first block of the first texture component using a first reference block indicated by a motion vector for the first block; and predicting a second block of the first depth component using a second reference block indicated by the motion vector for the first block, wherein the second block is spatially collocated, within the first depth component, with the first block of the first texture component;

decoding video data of a second coded view that comprises a second view component comprising a second texture component having the first resolution and a second depth component having the first resolution to produce a second picture having the first resolution;

upsampling the first picture to form a first upsampled picture having a second resolution, wherein the second resolution is greater than the first resolution;

upsampling the second picture to form a second upsampled picture having the second resolution; and decoding video data of a third coded view that comprises a third view component comprising a third texture component having the second resolution and a third depth component having the second resolution relative to the first upsampled picture and the second upsampled picture to produce a third picture having the second resolution.

2. The method of claim 1, further comprising coding a modified subset sequence parameter set with a profile compliant with a three-dimensional video (3DV) profile of a video coding standard, wherein the modified subset sequence parameter set extends a subset sequence parameter set design of multiview video coding (MVC) and provides further extensibility using data coded at the end of the modified subset sequence parameter set.

3. The method of claim 1, wherein the first picture comprises the first texture component, wherein the second picture comprises the second texture component, and wherein decoding the video data of the third coded view comprises:
forming first prediction data for the third texture component from one or more portions of the first upsampled picture;
forming second prediction for the third texture component data from one or more portions of the second upsampled picture; and
decoding the third texture component using the first prediction data and the second prediction data.

4. The method of claim 1, wherein the first picture comprises the first depth component, wherein the second picture comprises the second depth component, and wherein decoding the video data of the third coded view comprises:
forming first prediction data for the third depth component from one or more portions of the first upsampled picture;
forming second prediction for the third depth component data from one or more portions of the second upsampled picture; and
decoding the third depth component using the first prediction data and the second prediction data.

5. The method of claim 1, wherein decoding the video data of the third coded view comprises
predicting a third block of the third depth component using the second reference block indicated by the motion vector for the first block.

6. The method of claim 1, further comprising receiving information indicative of profiles to which the first coded view, the second coded view, and the third coded view conform.

7. The method of claim 6, wherein the information indicates a number of blocks in the first picture, a number of blocks in the second picture, and a number of blocks in the third picture.

8. The method of claim 6, wherein the information indicates that the third view is predicted relative to the first view and the second view.

9. The method of claim 8, wherein receiving the information comprises receiving sequence parameter sets for the first coded view, the second coded view, and the third coded view.

10. The method of claim 1, wherein the first picture comprises a first downsampled picture, and wherein the second picture comprises a second downsampled picture, the method further comprising:
downsampling a first received picture to produce the first downsampled picture, wherein the first received picture has the second resolution;
downsampling a second received picture to produce the second downsampled picture, wherein the second received picture has the second resolution;
encoding the first downsampled picture to produce the video data of the first coded view;
encoding the second downsampled picture to produce the video data of the second coded view; and
encoding a third received picture relative to the first upsampled picture and the second upsampled picture to produce the video data of the third coded view, wherein the third received picture has the second resolution.

11. The method of claim 10, further comprising:
encoding a first depth map associated with the first received picture, wherein the first depth map has the first resolution;
forming a first view component comprising a first texture component comprising the encoded first downsampled picture and a first depth component comprising the encoded first depth map;
encoding a second depth map associated with the second received picture, wherein the second depth map has the first resolution;
forming a second view component comprising a second texture component comprising the encoded second downsampled picture and a second depth component comprising the encoded second depth map;
encoding a third depth map associated with the third received picture, wherein the third depth map has the second resolution; and
forming a fourth view component comprising a fourth texture component comprising the encoded third picture and a fourth depth component comprising the encoded third depth map.

12. The method of claim 11, wherein encoding the third received picture comprises:
forming first prediction data for the third picture from one or more portions of the first upsampled picture;
forming second prediction for the third picture from one or more portions of the second upsampled picture; and
encoding the third picture using the first prediction data and the second prediction data.

13. The method of claim 11, wherein encoding the third depth map comprises:
decoding the encoded first depth map;
upsampling the decoded first depth map to form a first upsampled depth map;
forming first prediction data for the third depth map from one or more portions of the first upsampled depth map;
decoding the encoded second depth map;

upsampling the decoded second depth map to form a second upsampled depth map;
forming second prediction for the third depth map from one or more portions of the second upsampled depth map; and
encoding the third depth map using the first prediction data and the second prediction data.

14. The method of claim 11,
wherein encoding the first downsampled picture comprises calculating a motion vector for a first block of the first downsampled picture, and
wherein encoding the first depth map comprises predicting a second block of the first depth map using a second reference block indicated by the motion vector relative to the second block, wherein the second block is spatially collocated, within the first depth map, with the first block of the first downsampled picture.

15. The method of claim 10, further comprising producing information indicative of profiles to which the first coded view, the second coded view, and the third coded view conform.

16. The method of claim 15, wherein the information indicates a number of blocks in the first downsampled picture, a number of blocks in the second downsampled picture, and a number of blocks in the third picture.

17. The method of claim 15, wherein the information indicates that the third view is predicted relative to the first view and the second view.

18. The method of claim 15, wherein producing the information comprises producing sequence parameter sets for the first coded view, the second coded view, and the third coded view.

19. A device for coding video data, the device comprising:
a memory configured to store the video data; and
a video coder configured to:
  decode a first coded view of the video data, the first coded view comprising a first view component comprising a first texture component having the first resolution and a first depth component having the first resolution, to produce a first picture having a first resolution, wherein, to decode the first coded view, the one or more processors are configured to:
    predict a first block of the first texture component using a first reference block indicated by a motion vector for the first block; and
    predict a second block of the first depth component using a second reference block indicated by the motion vector for the first block, wherein the second block is spatially collocated, within the first depth component, with the first block of the first texture component,
  decode a second coded view of the video data, the second coded view comprising a second view component comprising a second texture component having the first resolution and a second depth component having the first resolution to produce a second picture having the first resolution,
  upsample the first picture to form a first upsampled picture having a second resolution, wherein the second resolution is greater than the first resolution,
  upsample the second picture to form a second upsampled picture having the second resolution, and
  decode a third coded view of the video data, the third coded view comprising a third view component comprising a third texture component having the second resolution and a third depth component having the second resolution relative to the first upsampled picture and the second upsampled picture to produce a third picture having the second resolution.

20. The device of claim 19, wherein the first picture comprises the first texture component, wherein the second picture comprises the second texture component, and wherein to decode the third coded view of the video data, the video coder is configured to form first prediction data for the third texture component from one or more portions of the first upsampled picture, form second prediction for the third texture component data from one or more portions of the second upsampled picture, and decode the third texture component using the first prediction data and the second prediction data.

21. The device of claim 19, wherein the first picture comprises the first depth component, wherein the second picture comprises the second depth component, and wherein to decode the third coded view of the video data, the video coder is configured to form first prediction data for the third depth component from one or more portions of the first upsampled picture, form second prediction for the third depth component data from one or more portions of the second upsampled picture, and decode the third depth component using the first prediction data and the second prediction data.

22. The device of claim 19, wherein the video coder is configured to receive information indicative of profiles to which the first coded view, the second coded view, and the third coded view conform, information indicative of a number of blocks in the first picture, a number of blocks in the second picture, and a number of blocks in the third picture, and information indicating that the third view is predicted relative to the first view and the second view.

23. The device of claim 19, wherein the video coder comprises a video decoder.

24. The device of claim 19, wherein the video coder comprises a video encoder, wherein the first picture comprises a first downsampled picture, wherein the second picture comprises a second downsampled picture, and wherein the video encoder is further configured to downsample a first received picture to produce the first downsampled picture, wherein the first received picture has the second resolution, downsample a second received picture to produce the second downsampled picture, wherein the second received picture has the second resolution, encode the first downsampled picture to produce the first coded view of the video data, encode the second downsampled picture to produce the second coded view of the video data, and encode a third received picture relative to the first upsampled picture and the second upsampled picture to produce the third coded view of the video data, wherein the third received picture has the second resolution.

25. The device of claim 24, wherein the video encoder is further configured to encode a first depth map associated with the first received picture, wherein the first depth map has the first resolution, form a first view component comprising a first texture component comprising the encoded first downsampled picture and a first depth component comprising the encoded first depth map, encode a second depth map associated with the second received picture, wherein the second depth map has the first resolution, form a second view component comprising a second texture component comprising the encoded second downsampled picture and a second depth component comprising the encoded second depth map, encode a third depth map associated with the third received picture, wherein the third depth map has the second resolution, and form a fourth view component comprising a fourth texture component comprising the encoded third picture and a fourth depth component comprising the encoded third depth map.

26. The device of claim 25, wherein to encode the third received picture, the video encoder is configured to form first prediction data for the third picture from one or more portions of the first upsampled picture, form second prediction for the third picture from one or more portions of the second upsampled picture, and encode the third picture using the first prediction data and the second prediction data.

27. The device of claim 25, wherein to encode the third depth map, the video encoder is configured to decode the encoded first depth map, upsample the decoded first depth map to form a first upsampled depth map, form first prediction data for the third depth map from one or more portions of the first upsampled depth map, decode the encoded second depth map, upsample the decoded second depth map to form a second upsampled depth map, form second prediction for the third depth map from one or more portions of the second upsampled depth map, and encode the third depth map using the first prediction data and the second prediction data.

28. The device of claim 24, wherein the video encoder is further configured to produce information indicative of profiles to which the first coded view, the second coded view, and the third coded view conform, information indicating a number of blocks in the first downsampled picture, a number of blocks in the second downsampled picture, and a number of blocks in the third picture, and information indicating that the third view is predicted relative to the first view and the second view.

29. The device of claim 19, wherein the device comprises at least one of:
    an integrated circuit;
    a microprocessor; or
    a wireless communication device that includes the video coder.

30. A device for coding video data, the device comprising:
    means for decoding video data of a first coded view that comprises a first view component comprising a first texture component having the first resolution and a first depth component having the first resolution to produce a first picture having first resolution, the means for decoding comprising:
        means for predicting a first block of the first texture component using a first reference block indicated by a motion vector for the first block; and
        means for predicting a second block of the first depth component using a second reference block indicated by the motion vector for the first block, wherein the second block is spatially collocated, within the first depth component, with the first block of the first texture component;
    means for decoding video data of a second coded view that comprises a second view component comprising a second texture component having the first resolution and a second depth component having the first resolution to produce a second picture having the first resolution;
    means for upsampling the first picture to form a first upsampled picture having a second resolution, wherein the second resolution is greater than the first resolution;
    means for upsampling the second picture to form a second upsampled picture having the second resolution; and
    means for decoding video data of a third coded view relative to the first upsampled picture and the second upsampled picture to produce a third picture having the second resolution.

31. The device of claim 30, wherein the first picture comprises the first texture component, wherein the second picture comprises the second texture component, and wherein the means for decoding the video data of the third coded view comprises:
    means for forming first prediction data for the third texture component from one or more portions of the first upsampled picture;
    means for forming second prediction for the third texture component data from one or more portions of the second upsampled picture; and
    means for decoding the third texture component using the first prediction data and the second prediction data.

32. The device of claim 30, wherein the first picture comprises the first depth component, wherein the second picture comprises the second depth component, and wherein the means for decoding the video data of the third coded view comprises:
    means for forming first prediction data for the third depth component from one or more portions of the first upsampled picture;
    means for forming second prediction for the third depth component data from one or more portions of the second upsampled picture; and
    means for decoding the third depth component using the first prediction data and the second prediction data.

33. The device of claim 30, further comprising means for receiving information indicative of profiles to which the first coded view, the second coded view, and the third coded view conform, information indicating a number of blocks in the first picture, a number of blocks in the second picture, and a number of blocks in the third picture, and information indicating that the third view is predicted relative to the first view and the second view.

34. The device of claim 30, wherein the first picture comprises a first downsampled picture, and wherein the second picture comprises a second downsampled picture, further comprising:
    means for downsampling a first received picture to produce the first downsampled picture, wherein the first received picture has the second resolution;
    means for downsampling a second received picture to produce the second downsampled picture, wherein the second received picture has the second resolution;
    means for encoding the first downsampled picture to produce the video data of the first coded view;
    means for encoding the second downsampled picture to produce the video data of the second coded view; and
    means for encoding a third received picture relative to the first upsampled picture and the second upsampled picture to produce the video data of the third coded view, wherein the third received picture has the second resolution.

35. The device of claim 34, further comprising:
    means for encoding a first depth map associated with the first received picture, wherein the first depth map has the first resolution;
    means for forming a first view component comprising a first texture component comprising the encoded first downsampled picture and a first depth component comprising the encoded first depth map;
    means for encoding a second depth map associated with the second received picture, wherein the second depth map has the first resolution;
    means for forming a second view component comprising a second texture component comprising the encoded second downsampled picture and a second depth component comprising the encoded second depth map;

means for encoding a third depth map associated with the third received picture, wherein the third depth map has the second resolution; and means for forming a fourth view component comprising a fourth texture component comprising the encoded third picture and a fourth depth component comprising the encoded third depth map.

36. The device of claim 35, wherein the means for encoding the third received picture comprises:
   means for forming first prediction data for the third picture from one or more portions of the first upsampled picture;
   means for forming second prediction for the third picture from one or more portions of the second upsampled picture; and
   means for encoding the third picture using the first prediction data and the second prediction data.

37. The device of claim 35, wherein the means for encoding the third depth map comprises:
   means for decoding the encoded first depth map;
   means for upsampling the decoded first depth map to form a first upsampled depth map;
   means for forming first prediction data for the third depth map from one or more portions of the first upsampled depth map;
   means for decoding the encoded second depth map;
   means for upsampling the decoded second depth map to form a second upsampled depth map;
   means for forming second prediction for the third depth map from one or more portions of the second upsampled depth map; and
   means for encoding the third depth map using the first prediction data and the second prediction data.

38. The device of claim 34, further comprising producing information indicative of profiles to which the first coded view, the second coded view, and the third coded view conform, information indicating a number of blocks in the first downsampled picture, a number of blocks in the second downsampled picture, and a number of blocks in the third picture, and information indicating that the third view is predicted relative to the first view and the second view.

39. A non-transitory computer-readable storage medium having stored thereon instructions that, when executed, cause one or more processors of a video coding device to:
   decode video data of a first coded view that comprises a first view component comprising a first texture component having the first resolution and a first depth component having the first resolution to produce a first picture having the first resolution, the instructions to decode comprising instructions that, when executed, cause the one or more processors to:
     predict a first block of the first texture component using a first reference block indicated by a motion vector for the first block; and
     predict a second block of the first depth component using a second reference block indicated by the motion vector for the first block, wherein the second block is spatially collocated, within the first depth component, with the first block of the first texture component;
   decode video data of a second coded view that comprises a second view component comprising a second texture component having the first resolution and a second depth component having the first resolution to produce a second picture having the first resolution;
   upsample the first picture to form a first upsampled picture having a second resolution, wherein the second resolution is greater than the first resolution;
   upsample the second picture to form a second upsampled picture having the second resolution; and
   decode video data of a third coded view that comprises a third view component comprising a third texture component having the second resolution and a third depth component having the second resolution relative to the first upsampled picture and the second upsampled picture to produce a third picture having the second resolution.

40. The non-transitory computer-readable storage medium of claim 39, wherein the first picture comprises the first texture component, wherein the second picture comprises the second texture component, and wherein the instructions that cause the one or more processors to decode the video data of the third coded view comprise instructions that cause the one or more processors to:
   form first prediction data for the third texture component from one or more portions of the first upsampled picture;
   form second prediction for the third texture component data from one or more portions of the second upsampled picture; and
   decode the third texture component using the first prediction data and the second prediction data.

41. The non-transitory computer-readable storage medium of claim 39, wherein the first picture comprises the first depth component, wherein the second picture comprises the second depth component, and wherein the instructions that cause the one or more processors to decode the video data of the third coded view comprise instructions that cause the one or more processors to:
   form first prediction data for the third depth component from one or more portions of the first upsampled picture;
   form second prediction for the third depth component data from one or more portions of the second upsampled picture; and
   decode the third depth component using the first prediction data and the second prediction data.

42. The non-transitory computer-readable storage medium of claim 39, further having stored thereon instructions that cause the one or more processors to receive information indicative of profiles to which the first coded view, the second coded view, and the third coded view conform, information indicating a number of blocks in the first picture, a number of blocks in the second picture, and a number of blocks in the third picture, and information indicating that the third view is predicted relative to the first view and the second view.

43. The non-transitory computer-readable storage medium of claim 39, wherein the first picture comprises a first downsampled picture, and wherein the second picture comprises a second downsampled picture, further comprising instructions that cause the one or more processors to:
   downsample a first received picture to produce the first downsampled picture, wherein the first received picture has the second resolution;
   downsample a second received picture to produce the second downsampled picture, wherein the second received picture has the second resolution;
   encode the first downsampled picture to produce the video data of the first coded view;
   encode the second downsampled picture to produce the video data of the second coded view; and
   encode a third received picture relative to the first upsampled picture and the second upsampled picture to produce the video data of the third coded view, wherein the third received picture has the second resolution.

44. The non-transitory computer-readable storage medium of claim 43, further having stored thereon instructions that cause the one or more processors to:
- encode a first depth map associated with the first received picture, wherein the first depth map has the first resolution;
- form a first view component comprising a first texture component comprising the encoded first downsampled picture and a first depth component comprising the encoded first depth map;
- encode a second depth map associated with the second received picture, wherein the second depth map has the first resolution;
- form a second view component comprising a second texture component comprising the encoded second downsampled picture and a second depth component comprising the encoded second depth map;
- encode a third depth map associated with the third received picture, wherein the third depth map has the second resolution; and
- form a fourth view component comprising a fourth texture component comprising the encoded third picture and a fourth depth component comprising the encoded third depth map.

45. The non-transitory computer-readable storage medium of claim 44, wherein the instructions that cause the one or more processors to encode the third received picture comprise instructions that cause the one or more processors to:
- form first prediction data for the third picture from one or more portions of the first upsampled picture;
- form second prediction for the third picture from one or more portions of the second upsampled picture; and
- encode the third picture using the first prediction data and the second prediction data.

46. The non-transitory computer-readable storage medium of claim 44, wherein the instructions that cause the one or more processors to encode the third depth map comprise instructions that cause the one or more processors to:
- decode the encoded first depth map;
- upsample the decoded first depth map to form a first upsampled depth map;
- form first prediction data for the third depth map from one or more portions of the first upsampled depth map;
- decode the encoded second depth map;
- upsample the decoded second depth map to form a second upsampled depth map;
- form second prediction for the third depth map from one or more portions of the second upsampled depth map; and
- encode the third depth map using the first prediction data and the second prediction data.

47. The non-transitory computer-readable storage medium of claim 43, further having stored thereon instructions that cause the one or more processors to produce information indicative of profiles to which the first coded view, the second coded view, and the third coded view conform, information indicating a number of blocks in the first downsampled picture, a number of blocks in the second downsampled picture, and a number of blocks in the third picture, and information indicating that the third view is predicted relative to the first view and the second view.

48. The method of claim 1, the method being executable on a wireless communication device, wherein the device comprises:
- a memory configured to store the video data;
- a processor configured to execute instructions to process the video data stored in the memory; and
- a receiver configured to receive the video data of the first, second coded view, and third coded views.

49. The method of claim 48, wherein the wireless communication device is a cellular telephone and the video data of the first, second, and third coded views are received by the receiver and modulated according to a cellular communication standard.

50. The device of claim 19, wherein the device is a wireless communication device, the device further comprising a receiver configured to receive the first, second, and third coded views of the video data.

51. The device of claim 50, wherein the wireless communication device is a cellular telephone and the first, second, and third coded views of the video data are received by the receiver and modulated according to a cellular communication standard.

* * * * *